US011938743B2

(12) United States Patent
Go et al.

(10) Patent No.: US 11,938,743 B2
(45) **Date of Patent: *Mar. 26, 2024**

(54) PRINTING APPARATUS AND A PRINT ENGINE ASSEMBLY

(71) Applicant: Hand Held Products, Inc., Charlotte, NC (US)

(72) Inventors: Florante Sumalinog Go, Singapore (SG); Rajan Narayanaswami, Singapore (SG); David Djayaputra, Singapore (SG)

(73) Assignee: Hand Held Products, Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/149,478

(22) Filed: Jan. 3, 2023

(65) Prior Publication Data

US 2023/0147281 A1 May 11, 2023

Related U.S. Application Data

(63) Continuation of application No. 16/939,998, filed on Jul. 27, 2020, now Pat. No. 11,571,918.

(51) Int. Cl.

| | |
|---|---|
| ***B41J 25/304*** | (2006.01) |
| ***B41J 25/00*** | (2006.01) |
| ***B41J 25/308*** | (2006.01) |

(52) U.S. Cl.

CPC ........... *B41J 25/304* (2013.01); *B41J 25/001* (2013.01); *B41J 25/308* (2013.01);

(Continued)

(58) Field of Classification Search

CPC ...... B41J 25/304; B41J 25/001; B41J 25/308; B41J 25/3082; B41J 25/3084;

(Continued)

(56) References Cited

U.S. PATENT DOCUMENTS

| | | | |
|---|---|---|---|
| 11,571,918 B2 * | 2/2023 | Go | B41J 25/304 |
| 2006/0139405 A1 | 6/2006 | Nellen | |

(Continued)

FOREIGN PATENT DOCUMENTS

| | | |
|---|---|---|
| CN | 1528597 A | 9/2004 |
| CN | 1796113 A | 7/2006 |

(Continued)

OTHER PUBLICATIONS

CN Notice of Allowance dated Jul. 28, 2023 for CN Application No. 202110849710, 4 page(s).

(Continued)

*Primary Examiner* — Henok D Legesse
(74) *Attorney, Agent, or Firm* — Alston & Bird LLP

(57) ABSTRACT

An example printing apparatus is illustrated. The printing apparatus includes a print engine assembly. The print engine assembly further includes a bottom chassis portion. The print engine assembly also includes a top chassis portion. The print engine assembly also includes a print head positioned within the top chassis portion. The print engine assembly also includes a plurality of offset pins coupled to the print head, where the plurality of offset pins abuts the bottom chassis portion, and where the plurality of offset pins enables the print head to be positioned at a predetermined distance from the bottom chassis portion.

20 Claims, 9 Drawing Sheets

(52) U.S. Cl.
CPC ....... *B41J 25/3082* (2013.01); *B41J 25/3084* (2013.01); *B41J 25/3086* (2013.01); *B41J 25/3088* (2013.01); *B41J 25/00* (2013.01)

(58) Field of Classification Search
CPC .... B41J 25/3086; B41J 25/3088; B41J 25/00; B41J 2/442; B41J 25/34; B41J 2202/31; G03G 15/34; G03G 15/652
See application file for complete search history.

(56) References Cited

U.S. PATENT DOCUMENTS

| | | | |
|---|---|---|---|
| 2012/0092403 | A1 | 4/2012 | Profaca et al. |
| 2013/0100207 | A1 | 4/2013 | Van Der Zwan |
| 2014/0184685 | A1 | 7/2014 | Profaca et al. |
| 2017/0282614 | A1 | 10/2017 | Lutz et al. |
| 2018/0370261 | A1 | 12/2018 | Tan et al. |
| 2020/0113080 | A1 | 4/2020 | Profaca |

FOREIGN PATENT DOCUMENTS

| | | | |
|---|---|---|---|
| CN | 201105540 | Y | 8/2008 |
| CN | 103313855 | A | 9/2013 |
| CN | 204278537 | U | 4/2015 |
| CN | 104972772 | A | 10/2015 |
| CN | 107000433 | A | 8/2017 |
| CN | 110126476 | A | 8/2019 |
| EP | 2944475 | A1 | 11/2015 |
| IN | 201077192 | Y | 6/2008 |
| WO | 2020/051066 | A1 | 3/2020 |

OTHER PUBLICATIONS

CN Office Action dated Apr. 6, 2023 for CN Application No. 202110849710, 6 page(s).
CN Office Action dated Oct. 10, 2022 for CN Application No. 202110849710.
English translation of CN Notice of Allowance dated Jul. 28, 2023 for CN Application No. 202110849710, 3 page(s).
English Translation of CN Office Action dated Apr. 6, 2023 for CN Application No. 202110849710, 9 page(s).
English Translation of CN Office Action including Search Report dated Oct. 10, 2022 for CN Application No. 202110849710.
Extended European search report dated Jan. 5, 2022 for EP Application No. 21187813, 16 pages.
Non-Final Rejection dated Jun. 20, 2022 for U.S. Appl. No. 16/939,998.
Notice of Allowance and Fees Due (PTOL-85) dated Oct. 5, 2022 for U.S. Appl. No. 16/939,998.
U.S. Appl. No. 16/939,998, filed Jul. 27, 2020, U.S. Pat. No. 11,571,918, Patented.
EP Office Action dated Oct. 20, 2023 for EP Application No. 21187813, 4 page(s).

* cited by examiner

PRINTING APPARATUS AND A PRINT ENGINE ASSEMBLY

CROSS-REFERENCE TO RELATED APPLICATIONS

This application is a continuation of U.S. patent application Ser. No. 16/939,998, filed Jul. 27, 2020, the contents of which is incorporated herein by reference in its entirety.

TECHNICAL FIELD

Example embodiments of the present disclosure relate generally to a printing apparatus and, more particularly, to a print engine assembly in the printing apparatus.

BACKGROUND

A typical printer may include a print head that may be configured to print content on print media. The print head may correspond to a thermal print head, an ink jet print head, or a laser print head. The laser print head may include a laser light source that may be utilized, in one implementation, to ionize an ink toner to print content in the print media. In another implementation, the laser light source may be configured to directly point the laser onto the print media to print content on the print media.

BRIEF SUMMARY

Various embodiments described herein illustrate printing apparatus that includes a print engine assembly. The print engine assembly further includes a bottom chassis portion. The print engine assembly also includes a top chassis portion. The print engine assembly also includes a print head positioned within the top chassis portion. The print engine assembly also includes a plurality of offset pins coupled to the print head, where the plurality of offset pins abuts the bottom chassis portion, and where the plurality of offset pins enables the print head to be positioned at a predetermined distance from the bottom chassis portion.

Various embodiments described herein illustrate a print engine assembly that includes a bottom chassis portion. The print engine assembly also includes a top chassis portion. The print engine assembly also includes a print head positioned within the top chassis portion. The print engine assembly also includes a plurality of offset pins coupled to the print head, where the plurality of offset pins abuts the bottom chassis portion, and where the plurality of offset pins enables the print head to be positioned at a predetermined distance from the bottom chassis portion. Various embodiments described herein illustrate a print head that includes a top surface configured to be coupled to a top chassis portion of a print engine assembly, through at least one biasing member; and a bottom surface configured to be coupled to a plurality of offset pins, where the plurality of offset pins is configured to be abutting a top surface of a bottom chassis portion of the print engine assembly, where the plurality of offset pins enables the bottom surface of the print head to be positioned at a predetermined distance from the top surface of the bottom chassis portion.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION OF THE INVENTION

Figure 1:
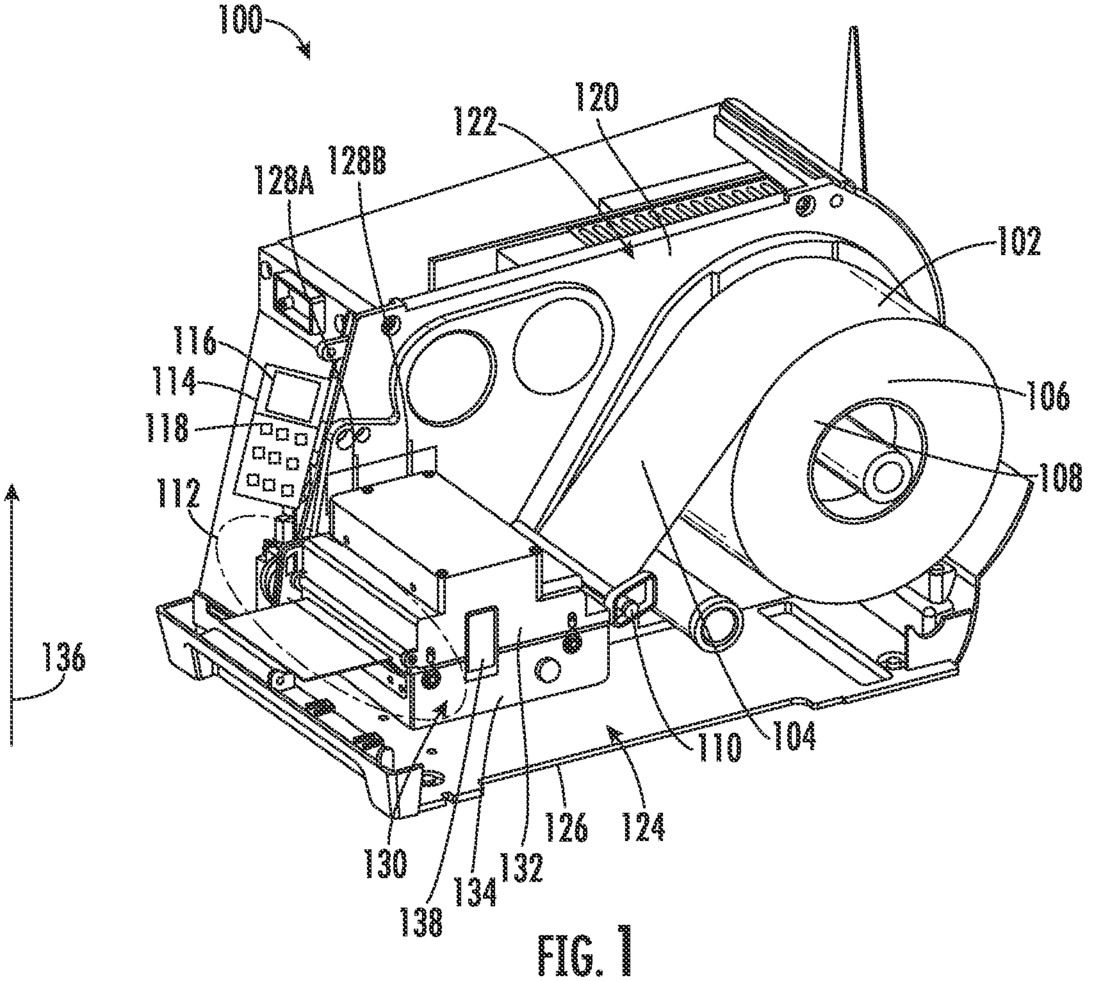
FIG. 1 illustrates an example printing apparatus, according to one or more embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Unless the context requires otherwise, throughout the specification and claims which follow, the word "comprise" and variations thereof, such as, "comprises" and "comprising" are to be construed in an open sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, one or more particular features, structures, or characteristics from one or more embodiments may be combined in any suitable manner in one or more other embodiments.

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such component or feature may be optionally included in some embodiments, or it may be excluded.

The term "electronically coupled," "electronically coupling," "electronically couple," "in communication with," "in electronic communication with," or "connected" in the present disclosure refers to two or more components being connected (directly or indirectly) through wired means (for example but not limited to, system bus, wired Ethernet) and/or wireless means (for example but not limited to, Wi-Fi, Bluetooth, ZigBee), such that data and/or information may be transmitted to and/or received from these components.

The terms "print media," "physical print media," "paper," and "labels" refer to tangible, substantially durable physical material onto which text, graphics, images and/or the like may be imprinted and persistently retained over time. Physical print media may be used for personal communications, business communications, and/or the like to convey prose expression (including news, editorials, product data, academic writings, memos, and many other kinds of communications), data, advertising, fiction, entertainment content, and illustrations and pictures. Physical print media may be generally derivatives of wood pulp or polymers, and includes conventional office paper, clear or tinted acetate media, news print, envelopes, mailing labels, product labels, and other kinds of labels. Thicker materials, such as cardstock or cardboard may be included as well. More generally, print media may be used to receive ink, dye, or toner, or may be a media whose color or shading can be selectively varied (for example, through selective application of heat, light, or chemicals) to create a persistent visual contrast (in black and white, shades of gray, and/or colors) that can be perceived by the human eye as texts, images, shapes, symbols, or graphics. In another example, the print media may be chemically treated such that when light falls on the print media, the color of the print media changes. Such print media may be used in the laser printers. In exemplary embodiments discussed throughout this document, reference may be made specifically to "paper" or "labels;" however, the operations, system elements, and methods of such exemplary applications may be applicable to media other than or in addition to the specifically mentioned "paper" or "labels."

The terms "printer" and "printing apparatus" refer to a device that may imprint texts, images, shapes, symbols, graphics, and/or the like onto print media to create a persistent, human-viewable representation of the corresponding texts, images, shapes, symbols, graphics, and/or the like. Printers may include, for example, laser printers.

For optimum operation of a printing apparatus in which the laser light source may be configured to directly point the laser onto the print media, various prerequisites need to be taken in to account prior to printing operation. Some example of the prerequisites may include, but not limited to, an orientation of the print media with respect to the print head, a focal point of the laser light source with respect to the location of the print media, and/or the like.

Apparatuses described herein disclose a printing apparatus that includes a print engine assembly. The print engine assembly includes a bottom chassis portion and a top chassis portion. The bottom chassis portion may include a platform that is configured to receive print media for printing content. On the other hand, the top chassis portion may be configured to receive a print head. In some examples, the print head corresponds to a Laser print head that may be configured to cause the Laser light to fall on the print media in a predetermined pattern. This may lead to printing content on the print media.

In some examples, the print head is positioned at a predetermined distance from the bottom chassis portion through a plurality of offset pins. In some examples, the plurality of offset pins may be coupled to the print head such that the plurality offset pins extend out from the print head and abut the platform defined on the bottom chassis portion. In some examples, the predetermined distance (maintained between the bottom chassis portion and print head) may be equitable to the focal length of the laser light source unit (in the print head). In such an example, maintaining the print head at the predetermined distance from the bottom chassis portion ascertains that the focal point of the laser light source unit is not disturbed during the printing operation.

FIG. 1 illustrates an example printing apparatus 100, according to one or more embodiments described herein. While not shown in FIG. 1, the printing apparatus 100 may comprise a power source, as well as a printer cover for housing various components in the interior of the printing apparatus 100.

The printing apparatus 100 may include a media supply roll 102. The media supply roll 102 may comprise print media 104 that may be wound on the media supply spool 106. In the example shown in FIG. 1, the printing apparatus 100 may comprise a media supply spindle 108, and the media supply spool 106 may be configured to be disposed on the media supply spindle 108.

In some examples, the printing apparatus 100 may comprise a media guiding spindle 110, which may be positioned to guide the print media from the media supply roll 102 to travel in a print direction along a print path within the printing apparatus 100. In some examples, the print path may correspond to a path between the media supply spindle 108 to an exit slit 112 along which the print media travels. Further, in some examples, the print direction may correspond to a direction along which the print media travels for the printing operation. In some examples, after texts, graphics, images and/or the like (as applicable) are imprinted on the print media, the print media may exit from the printing apparatus 100 from the exit slit 112.

In some examples, the printing apparatus 100 may comprise one or more motors (not shown) for rotating the media supply spool 106 disposed on the media supply spindle 108 in an anti-clockwise rotational direction, causing the print media to travel in the print direction along the print path. Additionally, or alternatively, the one or more motors may rotate the media guiding spindle 110 in the anti-clockwise rotational direction, causing the print media to travel in the print direction along the print path. Additionally, or alternatively, the one or more motors may rotate the media supply spool 106 and/or the media guiding spindle 110 in a clockwise rotational direction causing the print media to travel in a direction opposite to the print direction.

In some examples, the media supply spindle 108 and/or the media guiding spindle 110 may be eliminated, and the print media 104 may be fed into the printing apparatus 100 through an opening slit, and may exit from the printing apparatus 100 through an exit slit 112.

In some examples, the printing apparatus 100 may include a graphical user interface (GUI) 114 for enabling communications between a user and the printing apparatus 100. The GUI 114 may be communicatively coupled to other components of the printing apparatus 100 for displaying visual and/or auditory information and/or for receiving information from the user (e.g., typed, touched, spoken, etc.).

In the example shown in FIG. 1, the printing apparatus 100 may include the GUI 114 with, for example, a display 116 and a keypad 118. The display 116 may be configured to display various information associated with the printing apparatus 100. The keypad 118 may comprise function buttons that may be configured to perform various typical printing functions (e.g., cancel print job, advance print media, and the like) or be programmable for the execution of macros containing preset printing parameters for a particular type of print media. In some examples, the GUI 114 may be electronically coupled to a controller for controlling operations of the printing apparatus 100, in addition to other functions. The GUI 114 may be supplemented or replaced by other forms of data entry or printer control, such as a separate data entry and control module linked wirelessly or by a data cable operationally coupled to a computer, a router, or the like.

While FIG. 1 illustrates an example GUI 114, it is noted that the scope of the present disclosure is not limited to the example GUI 114 as shown in FIG. 1. In some embodiments, the user interface may be different from the one depicted in FIG. 1. In some embodiments, there may not be a user interface.

Referring back to FIG. 1, the printing apparatus 100 may comprise a back-spine section 120. In some examples, the back-spine section 120 may be made of material having rigid characteristics, such as aluminum alloy, stainless steel, and/or the like. In some examples, the back-spine section 120 may comprise a first surface 122. The first surface 122 may be in a perpendicular arrangement with a surface 124 of a printer base 126.

In some examples, at least one linear guide may be disposed on a surface of an example back-spine section of an example printer body. In some examples, each of at least one linear guide may comprise a corresponding linear rail and a corresponding linear block. In some examples, the corresponding linear rail may be fastened to the first surface of the back-spine section through, for example, bolts, screws, and/or the like. In some examples, the corresponding linear block may be coupled to the corresponding linear rail through, for example, ball bearings, rollers, and/or the like, such that the corresponding linear block may move and/or slide along the corresponding linear rail. Example linear guides may include, but not limited to, rolling element linear motion bearing guides, sliding contact linear motion bearing guides, and/or the like.

For example, in FIG. 1, a first linear guide 128A and a second linear guide 128B may be disposed on the first surface 122. The first linear guide 128A may, for example, comprise a linear rail fastened to the first surface 122 of the back-spine section 120, as well as a corresponding linear block (now shown) that is coupled to the linear rail and movable along the linear rail. Additionally, or alternatively, the second linear guide 128B may comprise a linear rail disposed on the first surface 122 of the back-spine section 120, and a corresponding linear block. In an example embodiment, the first linear guide 128A and the second linear guide 128B are positioned parallel to each other and may be positioned along a vertical axis 136 of the printing apparatus 100.

In some examples, a print engine assembly 130 of the printing apparatus 100 may be coupled to the first linear guide 128A and the second linear guide 128B through the corresponding linear block of the first linear guide 128A and second linear guide 128B, respectively. In an example embodiment, the print engine assembly 130 comprises a top chassis portion 132 and a bottom chassis portion 134. In some examples, the top chassis portion 132 of the print engine assembly 130 may be coupled to the first linear guide 128A and the second linear guide 128B through the corresponding linear block of the first linear guide 128A and second linear guide 128B, respectively. Further, in some examples, as the top chassis portion 132 may move along the linear rail(s) of first linear guide 128A and/or the second linear guide 128B along the vertical axis 136 of the printing apparatus 100.

In some examples, the bottom chassis portion 134 may be fastened to the first surface 122 of the back-spine section 120. In some examples, the bottom chassis portion 134 may be positioned under the top chassis portion 132 in the vertical axis 136 and may be configured to receive the print media from the media supply roll 102.

In some examples, as the top chassis portion 132 may move along the vertical axis 136 along its corresponding travel path, the top chassis portion 132 may reach and/or be positioned at a bottom point of the travel path in the vertical axis 136. When the top chassis portion 132 is positioned at the bottom point, the top chassis portion 132 may be removably coupled to the bottom chassis portion 134 through a latch 138.

Figure 2:
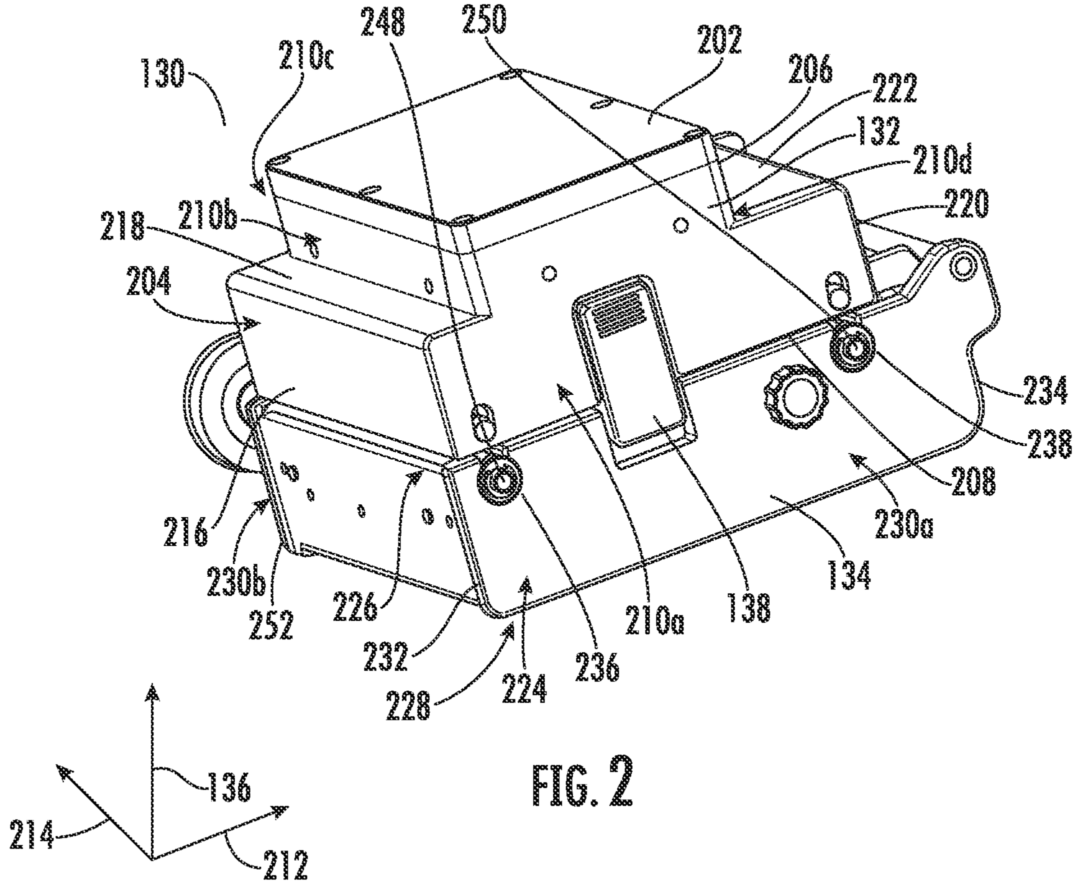
FIG. 2 illustrates a perspective view of a print engine assembly, according to one or more embodiments described herein.
Figure 3:
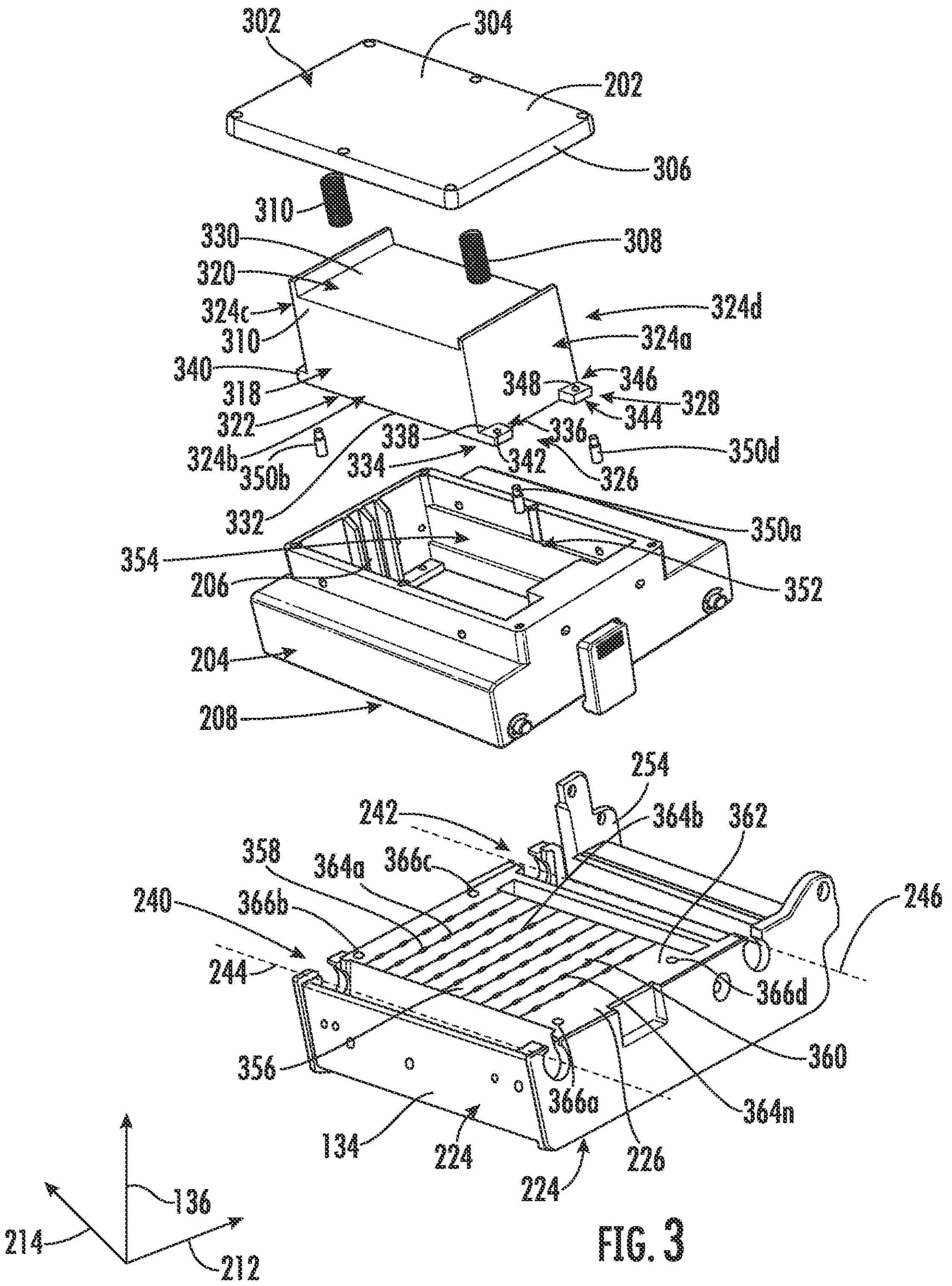
FIG. 3 illustrates an exploded view of the print engine assembly, according to one or more embodiments described herein.

The structure of the print engine assembly 130 is further described in conjunction with FIGS. 2 and 3.

FIG. 2 illustrates a perspective view of the print engine assembly 130, according to one or more embodiments described herein. In an example embodiment, the print engine assembly 130 includes the top chassis portion 132, the bottom chassis portion 134, and a top chassis cap 202.

In an example embodiment, the top chassis portion 132 has an outer surface 204 that may define a top end portion 206 and a bottom end portion 208, which does not include the top chassis cap 202. The top end portion 206 and the bottom end portion 208, of the top chassis portion 132, are spaced apart from each other along the vertical axis 136 of the printing apparatus 100. Further, in some examples, the bottom end portion 208 may be defined to be proximal to the bottom chassis portion 134, while the top end portion 206 may be defined to be distal from the bottom chassis portion 134, when the top chassis portion 132 is coupled to the bottom chassis portion 134.

In some examples, the top chassis portion 132 may have a rectangular shape with one or more sides 210*a*, 210*b*, 210*c*, and 210*d*. The side 210*a* and the side 210*c* may be defined to be opposite to each other along a longitudinal axis 214 of the print engine assembly 130. Similarly, the side 210*b* and the side 210*d* may be defined to be opposite to each other along a lateral axis 212 of the print engine assembly 130. In some examples, the scope of the disclosure is not limited to the top chassis portion 132 having a rectangular shape. In an example embodiment, the shape of the top chassis portion 132 may correspond to other polygons, without departing from the scope of the disclosure.

In an example embodiment, the outer surface 204 of the top chassis portion 132 defines a first wing portion 216 that protrudes out from the side 210*b* of the top chassis portion 132 along the lateral axis 212 of the print engine assembly 130. Additionally, the first wing portion 216 extends from the side 210*a* to the side 210*c* along the longitudinal axis 214 of the print engine assembly 130. In some examples, a length of the first wing portion 216 (along the longitudinal axis 214) may be same as a length of the top chassis portion 132 (along the longitudinal axis 214). Further, a height of the first wing portion 216 is less than a height of the top chassis portion 132. Accordingly, along the vertical axis 136 of the printing apparatus 100, the first wing portion 216 may define a step 218 with the side 210*b*.

In an example embodiment, similar to the first wing portion 216, the outer surface 204 of the top chassis portion 132 defines a second wing portion 220 that protrudes out from the side 210*d* of the top chassis portion 132 along the lateral axis 212 of the print engine assembly 130. Additionally, the second wing portion 220 extends from the side 210*a* to the side 210*c* along the longitudinal axis 214 of the print engine assembly 130. In some examples, a length of the second wing portion 220 (along the longitudinal axis 214) may be same as the length of the top chassis portion 132 (along the longitudinal axis 214). Further, a height of the second wing portion 220 is less than the height of the top chassis portion 132. Accordingly, along the vertical axis 136 of the printing apparatus 100, the second wing portion 220 may define a step 222 with the side 210*d*.

In an example embodiment, the side 210*a* is further configured to receive the latch 138 that facilitates removable coupling of the top chassis portion 132 with the bottom chassis portion 134.

In an example embodiment, as discussed above, the bottom chassis portion 134 is fixed to the first surface 122 of the back-spine section 120 (refer FIG. 1). Additionally, the bottom chassis portion 134 has an outer surface 224. In some examples, the outer surface 224 of the bottom chassis portion 134 defines a top end portion 226 of the bottom chassis portion 134, and a bottom end portion 228 of the bottom chassis portion 134. The bottom end portion 228 of the bottom chassis portion 134 is spaced apart from the top end portion 226 of the bottom chassis portion 134 along the vertical axis 136 of the print engine assembly 130. Further, the top end portion 226 of the bottom chassis portion 134 is proximal to the bottom end portion 208 of the top chassis portion 132, while the bottom end portion 228 of the bottom chassis portion 134 is distal from the bottom end portion 208 of the top chassis portion 132.

In an example embodiment, the outer surface 224 of the bottom chassis portion 134 defines at least two sides 230*a* and 230*b* of the bottom chassis portion 134. In an example embodiment, the side 230*a* may be spaced apart from the side 230*b* along the longitudinal axis 214 of the print engine assembly 130. In an example embodiment, the sides 230*a* has a first edge 232 and a second edge 234. In some examples, the first edge 232 is spaced apart from the second edge 234 along the lateral axis 212 of the print engine assembly 130. Similar to the side 230*a*, the side 230*b* has a third edge 252 and a fourth edge 254 (Refer FIG. 3). In some examples, the third edge 252 is spaced apart from the fourth edge 254 (refer FIG. 3) along the lateral axis 212 of the print engine assembly 130.

In an example embodiment, the outer surface 224 of the bottom chassis portion 134 may define a first circular notch 236 and a second circular notch 238 on the side 230*a*. Further, the first circular notch 236 and the second circular notch 238 are defined (by the outer surface 224 of the bottom chassis portion 134) at the top end portion 226 of the bottom chassis portion 134. Furthermore, the outer surface 224 of the bottom chassis portion 134 defines the first circular notch 236 proximal to the first edge 232 of the side 230*a*, and the second circular notch 238 proximal to the second edge 234 of the side 230*a*. Similarly, the outer surface 224 of the bottom chassis portion 134 may define a third circular notch 240 (refer FIG. 3) and a fourth circular notch 242 (refer FIG. 3) on the side 230*b* at the top end portion 226 of the bottom chassis portion 134. Further, the outer surface 224 defines the third circular notch 240 proximal to the third edge 252 of the side 230*b*, and the fourth circular notch 242 proximal to the fourth edge 254 of the side 230*b*. In some examples, the first circular notch 236 and the third circular notch 240 may have a coinciding central axis 244 (refer FIG. 3) extending along the longitudinal axis 214 of the print engine assembly 130. Similarly, the second circular notch 238 and the fourth circular notch 242 may have a coinciding central axis 246 (refer FIG. 3) extending along the longitudinal axis 214 of the print engine assembly 130.

In an example embodiment, the first circular notch 236 and the third circular notch 240 are configured to receive a first shaft 248 such that the first shaft 248 is rotatable in the first circular notch 236 and the third circular notch 240. Additionally, the third circular notch 240 and the fourth circular notch 242 are configured to receive a second shaft 250 such that the second shaft 250 is rotatable in the second circular notch 238 and the fourth circular notch 242. In some examples, the first shaft 248 and the second shaft 250 may correspond to rollers that may assist the travel of the print media 104 along the print path.

FIG. 3 illustrates an exploded view of the print engine assembly 130, according to one or more embodiments described herein.

In an example embodiment, the top chassis cap 202 has an outer surface 302 that may define a top end portion 304 of the top chassis cap 202 and a bottom end portion 306 of the top chassis cap 202. In some examples, the bottom end portion 306 of the top chassis cap 202 may abut the top end portion 206 of the top chassis portion 132 when the top chassis cap 202 is received on the top chassis portion 132. The structure of the bottom end portion 306 of the top chassis cap 202 is further described in conjunction with FIG. 4.

Figure 4:
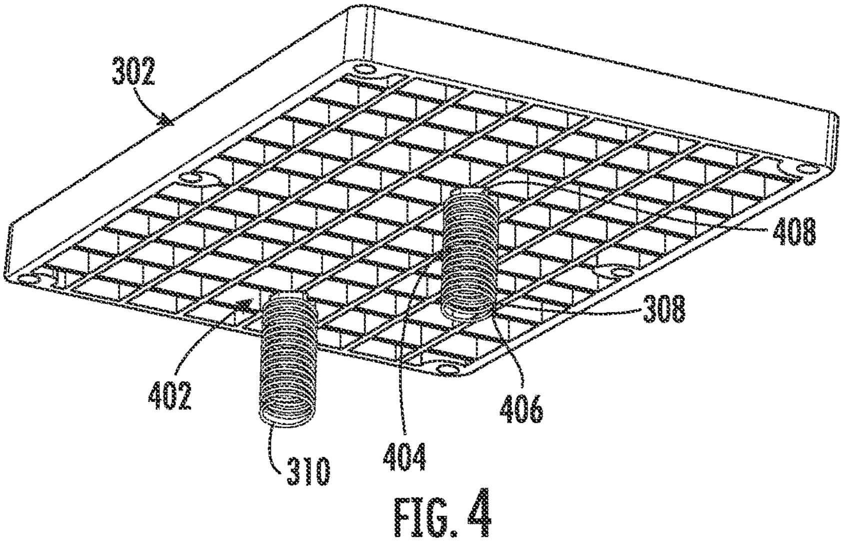
FIG. 4 illustrates a bottom perspective view of a top chassis cap, according to one or more embodiments described herein.

Referring to FIG. 4, a bottom perspective view of the top chassis cap 202 is illustrated, according to one or more embodiments described herein. The bottom end portion 306 of the top chassis cap 202 may define one or more protrusions 402 and 404 that may orthogonally extend out from the bottom end portion 306 of the top chassis cap 202. In some examples, the one or more protrusions 402 and 404 may be spaced apart along the longitudinal axis 214 of the print engine assembly 130. The one or more protrusions 402 and 404 may be configured to receive at least one biasing member. For example, the one or more protrusions 402 and 404 are configured to receive a first biasing member 308 and a second biasing member 310, respectively. In some examples, each of the first biasing member 308 and the second biasing member 310 has a first end 406 and a second end 408. The first end 406 of the first biasing member 308 is configured to be coupled to the protrusion 402. Further, the first end 406 of the second biasing member 310 is configured to be coupled to the protrusion 404. In some examples, the second end 408 of the first biasing member 308 and the second end 408 of the second biasing member 310 are configured to be coupled to a print head 316. The structure of the print head 316 is herein described in conjunction with FIG. 3 and FIG. 5.

Figure 5:
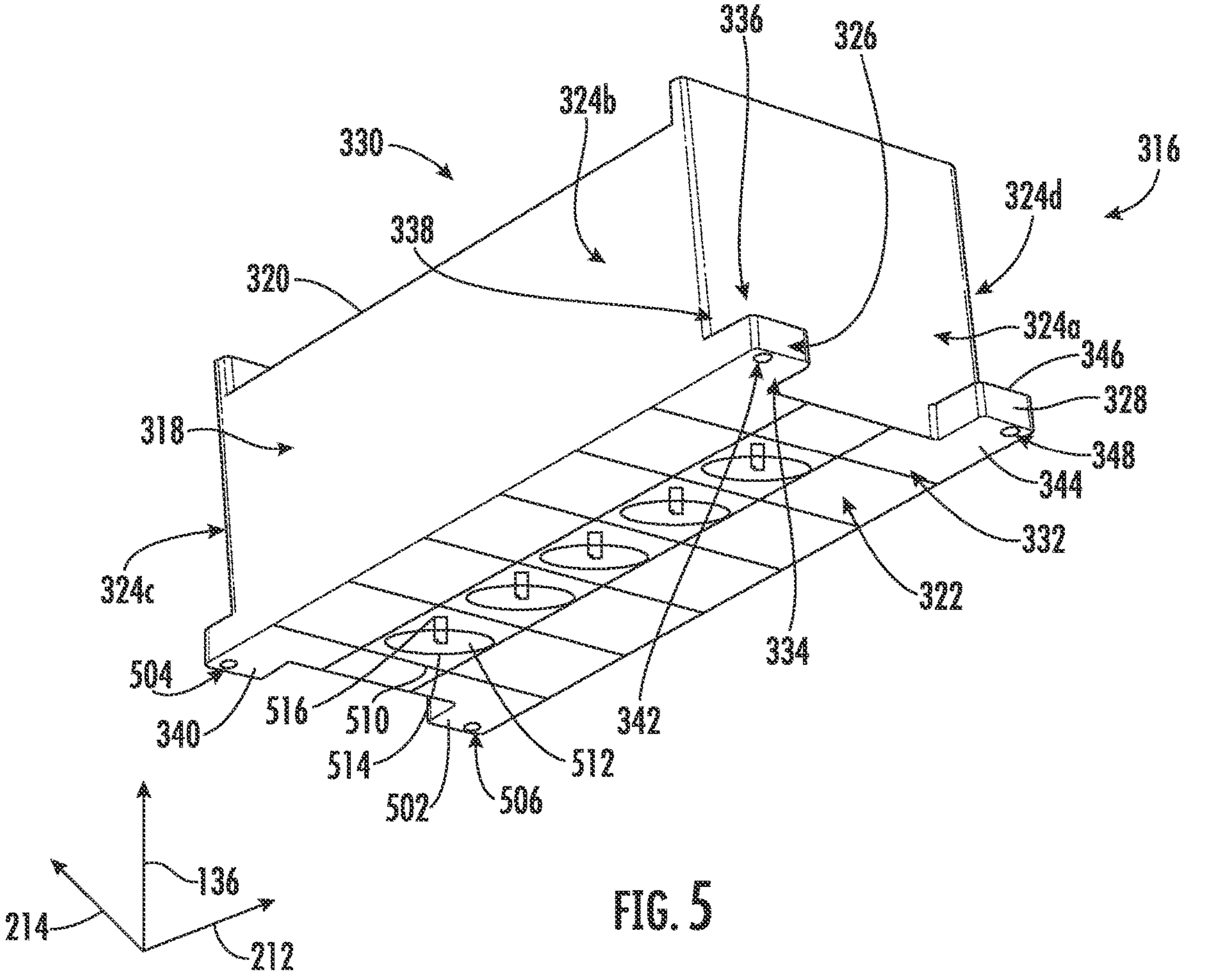
FIG. 5 illustrates a bottom perspective view of a print head, according to one or more embodiments described herein.

FIG. 5 illustrates a bottom perspective view of the print head 316, according to one or more embodiments described herein. Referring to FIG. 3 and FIG. 5, in an example embodiment, the print head 316 has an outer surface 318 that defines a top end portion 320 and a bottom end portion 322, of the print head 316. In some examples, the top end portion 320 of the print head 316 is configured to be coupled to the second end 408 of the first biasing member 308 and the second end 408 of the second biasing member 310. Accordingly, the print head 316 is configured to be coupled to the top chassis cap 202 through the first biasing member 308 and the second biasing member 310. In some examples, the scope of the disclosure is not limited to two biasing members being coupled to the print head 316. In an example embodiment, a single biasing member or more than two biasing members may be coupled to the print head 316, without departing from the scope of the disclosure.

Hereinafter, the outer surface 318 of the print head 316 at the top end portion 320 of the print head 316 is referred as a top surface 330 of the print head 316. Further, hereinafter, the outer surface 318 of the print head 316 at the bottom end portion 322 of the print head 316 is referred as a bottom surface 332 of the print head 316.

Referring to FIG. 5, in an example embodiment, the bottom surface 332 defines one or more laser recesses 510. Each of the one or more laser recesses 510 is configured to receive a laser light source unit 512. In some examples, the laser light source unit 512 includes a laser light source 514 and an optical assembly 516. The optical assembly 516 is configured to focus the light from the laser light source 514 on the bottom chassis portion 134 to print content on the print media 104.

In an example embodiment, the print head 316 has substantially rectangular shape with one or more sides 324*a*, 324*b*, 324*c*, and 324*d*. In some examples, the scope of the disclosure is not limited to the print head 316 having the rectangular shape. In an example embodiment, the print head 316 may have any other shape, without departing from the scope of the disclosure. In some examples, the sides 324*a* and 324*c* of the print head 316 are spaced apart from each other along the longitudinal axis 214 of the print engine assembly 130. Further, the sides 324*b* and 324*d* of the print head 316 are spaced apart from each other along the lateral axis 212 of the print engine assembly 130.

In an example embodiment, the outer surface 318 of the print head 316 further defines a first flange region 326 and a second flange region 328 on the side 324*a* such that the first flange region 326 and the second flange region 328 extend out from the side 324*a* along the longitudinal axis 214 of the print engine assembly 130. Further, the first flange region 326 is spaced apart from the second flange region 328 along the lateral axis 212 of the print engine assembly 130 such that a distance between the first flange region 326 and the second flange region 328 is less than a width of the print head 316 (along the lateral axis 212 of the print engine assembly 130). In some examples, the first flange region 326 comprises a bottom end 334 and a top end 336. The bottom end 334 of the first flange region 326 coincides with the bottom end portion 322 of the print head 316. Further, the top end 336 of the first flange region 326 is defined to be distal from the bottom end portion 322 of the print head 316.

In some examples, a width of the first flange region 326 along the vertical axis 136 of the printing apparatus 100 is less than a height of the print head 316 (along the vertical axis 136 of the printing apparatus 100). Accordingly, the first flange region 326 defines a step 338 with the side 324*a* of the print head 316. Additionally, the outer surface 318 of the print head 316 defines a recess 342 in the first flange region 326 such that the recess 342 extends from the bottom end 334 of the first flange region 326 towards the top end 336 of the first flange region 326. In some examples, the recess 342 extends along the vertical axis 136 of the printing apparatus 100.

In an example embodiment, the structure of the second flange region 328 is similar to the first flange region 326. For example, the second flange region 328 has a bottom end 344, a top end 346, and a recess 348 (that extends from the bottom end 344 of the second flange region 328 towards the top end 346 of the second flange region 328).

Similar to the first flange region 326 and the second flange region 328, the outer surface 318 of the print head 316 defines a third flange region 340 and a fourth flange region 502 (refer FIG. 5) on the side 324*c*. In some examples, the third flange region 340 and the fourth flange region 502 have structure same as the structure of the first flange region 326. For example, the width of each of the first flange region 326, the second flange region 328, the third flange region 340 and the fourth flange region 502 (along the vertical axis 136 of the printing apparatus 100 is same. Further, similar to the first flange region 326, the third flange region 340 and the fourth flange region 502 has a recess 504 and 506 (refer FIG. 5), respectively. It may be appreciated that the defining the first flange region 326, the second flange region 328, the third flange region 340 and the fourth flange region 502 may have different widths and/or different size without departing from the scope of the disclosure.

In an example embodiment, the first flange region 326, the second flange region 328, the third flange region 340 and the fourth flange region 502 are configured to receive a plurality of offset pins. For example, the first flange region 326, the second flange region 328, the third flange region 340 and the fourth flange region (not visible) are configured to receive the plurality of offset pins 350*a*, 350*d*, 350*b*, and 350*c*, respectively. In some examples, a structure of the each offset pin of the plurality of offset pins 350*a*, 350*b*, 350*c*, and 350*d* is same and is further described in conjunction with FIG. 6 and FIG. 7.

In some examples, the scope of the disclosure is not limited to the outer surface 318 of the print head 316 defining the first flange region 326, the second flange region 328, the third flange region 340 and the fourth flange region 502 on the sides 324*a* and 324*c*. In an example embodiment, the outer surface 318 of the print head 316 may define the first flange region 326, and the second flange region 328 on the side 324*b* of the print head 316. To this end, the outer surface 318 may define the third flange region 340 and the fourth flange region 502 on the side 324*d*. In some examples, the outer surface 318 may define only two flange regions such that the two flange regions may be positioned diagonally opposite to each other. For example, the outer surface 318 may define the first flange region 326 and the fourth flange region 502. In yet another embodiment, the outer surface 318 may define the second flange region 328, and the third flange region 340. In some examples, the scope of the disclosure is not limited to the first flange region 326, the second flange region 328, the third flange region 340 and the fourth flange region 502, defined at a plurality of corners of the print head 316. In an example embodiment, the first flange region 326, the second flange region 328, the third flange region 340 and the fourth flange region 502 may be defined at a middle of each side 324*a*, 324*b*, 324*c*, and 324*d* of the print head 316, without departing from the scope of the disclosure. Further, various other positions of the flange regions may be contemplated, without departing from the scope of the disclosure. In some examples, the scope of the disclosure is not limited to the print head 316 having four flanges. In an example embodiment, the print head 316 may have more than four flanges.

In some examples, the print head 316 may not include any flange region. In such an implementation, the plurality of offset pins 350*a*, 350*b*, 350*c*, and 350*d* may be received at the bottom end portion 322 of the print head 316. For example, the bottom end portion 322 of the print head 316 may receive the plurality of offset pins 350*a*, 350*b*, 350*c*, and 350*d* at the plurality of corners. In an example embodiment, the plurality of corners of the print head 316 may defined at regions where two or more sides of the print head 316 meet. In such an implementation, the outer surface 318 may define the recesses 342, 348, 504 and 506 at the plurality of corners of the print head 316, where the plurality of offset pins 350*a*, 350*b*, 350*c*, and 350*d* may be received within recesses 342, 348, 504 and 506 (defined at the plurality of corners of the print head 316).

In some examples, the scope of the disclosure is not limited to the plurality of offset pins 350*a*, 350*b*, 350*c*, and 350*d* as separate components. In an example embodiment, bottom surface 332 of the print head 316 may define one or more protrusions in each of the first flange region 326, the second flange region 328, the third flange region 340 and the fourth flange region 502 such that the one or more protrusions may extend out orthogonally from the bottom end portion 322 of the print head 316. In an example embodiment, the one or more protrusions may correspond to the plurality of offset pins 350*a*, 350*b*, 350*c*, and 350*d*. In scenarios, where the outer surface 318 of the print head 316 does not define the defining the first flange region 326, the second flange region 328, the third flange region 340 and the fourth flange region 502, the bottom surface 332 of the print head 316 may define the one or more protrusions at the plurality of corners of the print head 316. In some examples, the scope of the disclosure is not limited to defining the one or more protrusions (as the plurality of offset pins 350*a*, 350*b*, 350*c*, and 350*d*) at the plurality of corners of the print head 316. In an example embodiment, the bottom surface 332 of the print head 316 may define the one or more protrusions (as the plurality of offset pins 350*a*, 350*b*, 350*c*, and 350*d*) at any other position other than the plurality of corners of the print head 316. For example, the bottom surface 332 of the print head 316 may define the one or more protrusions (as the plurality of offset pins 350*a*, 350*b*, 350*c*, and 350*d*) at the bottom end portion 332 such that the one or more protrusions are defined at the middle of each of the one or more sides each side 324*a*, 324*b*, 324*c*, and 324*d* of the print head 316.

Figure 6:
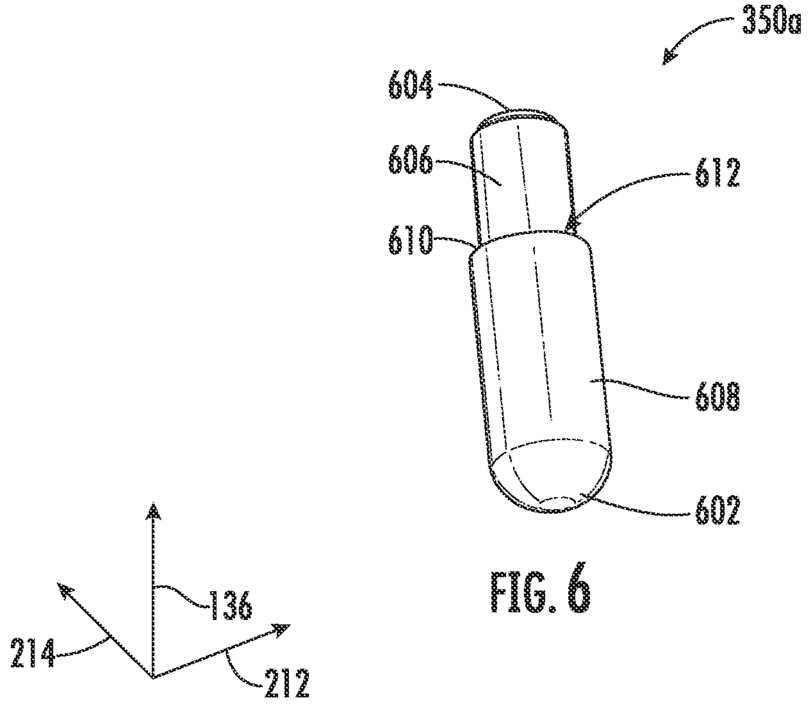
FIG. 6 illustrates a perspective view of an offset pin, according to one or more embodiments described herein.

FIG. 6 illustrates a perspective view of the offset pin 350*a*, according to one or more embodiments described herein. In an example embodiment, the offset pin 350*a* has a cylindrical shape and comprises a first end 602, a second end 604, a print head facing portion 606, and a bottom chassis facing portion 608. In some examples, the first end 602 is spaced apart from the second end 604 along the vertical axis 136 of the print engine assembly 130. Further, in some examples, the first end 602 of the offset pin 350*a* and the second end 604 of the offset pin 350*a*, may have a hemi-spherical shape. In some examples, the scope of the disclosure is not limited to the first end 602 and the second end 604 having the hemispherical shape. In an example embodiment, the first end 602 and the second end 604, of the offset pin 350*a*, may have any other shape, without departing from the scope of the disclosure. For example, the first end 602 and the second end 604 of the offset pin 350*a* are pointed. In yet another example, the first end 602 and the second end 604 of the offset pin 350*a* may have a conical shape, without departing from the scope of the disclosure.

In an example embodiment, the bottom chassis facing portion 608 extends from the first end 602 to a junction 610 between the bottom chassis facing portion 608 and the print head facing portion 606. The print head facing portion 606 extends from the junction 610 (between the print head facing portion 606 and the bottom chassis facing portion 608) and the second end 604. In an example embodiment, a diameter of the print head facing portion 606 is less than a diameter of the bottom chassis facing portion 608. Accordingly, a step 612 is defined at the junction 610 between the print head facing portion 606 and the bottom chassis facing portion 608.

As discussed, the offset pin 350*a* is configured to be received in the recess 342 defined in the first flange region 326. In some examples, the print head facing portion 606 of the offset pin 350*a* is configured to be received within the recess 342 of the first flange region 326 such that the step 612 on the offset pin 350*a* abuts the bottom end 334 of the first flange region 326. In some examples, the print head facing portion 606 is completely received in the recess 342 and only the bottom chassis facing portion 608 extends out from the bottom end 334 of the first flange region 326. For example, the print head facing portion 606 is press fitted in the recess 342 (defined in the first flange region 326) to fixedly couple the offset pin 350*a* with the print head 316. In such an embodiment, the step 612 may abut the bottom end portion 322 of the print head 316. The step 612 may ensure that only the bottom chassis facing portion 608 of the offset pin 350*a* extends out from the bottom end portion 322 of the print head 316. Accordingly, the print head facing portion 606 is completely received within the print head 316. Since the length of the print head facing portion 606 and the bottom end facing portion 608 is same throughout the plurality of offset pins 350*a*, 350*b*, 350*c*, and 350*d*, therefore, only the bottom end facing portion 608 of the plurality of offset pins 350*a*, 350*b*, 350*c*, and 350*d* extend out from the print head 316. Accordingly, the length of the portion of the plurality of offset pins 350*a*, 350*b*, 350*c*, and 350*d* that extend out from the bottom end portion 322 of the print head 316 is also same.

In some examples, the scope of the disclosure is not limited to the offset pin 350*a* press fitted in the recess 342 (defined in the first flange region 326). In an alternative embodiment, the offset pin 350*a* may be fastened with the recess 342 (defined in the first flange region 326) to couple the offset pin 350*a* with the recess 342 (defined in the first flange region 326). In such an embodiment, the step 612 may or may not abut the bottom end 334 of the first flange region 326 depending on a length of the portion of the offset pin 350*a* that extends out from the bottom end 334 of the first flange region 326. For example, depending on an amount of fastening of the offset pin 350*a* with the recess 342, the length of the portion of the offset pin 350*a* (extending out from the bottom end 334 of the first flange region 326) is determined. The structure of the offset pin 350*a* that can be fastened with the recess 342 (defined in the first flange region 326) is further described in conjunction with FIG. 7.

Figure 7:
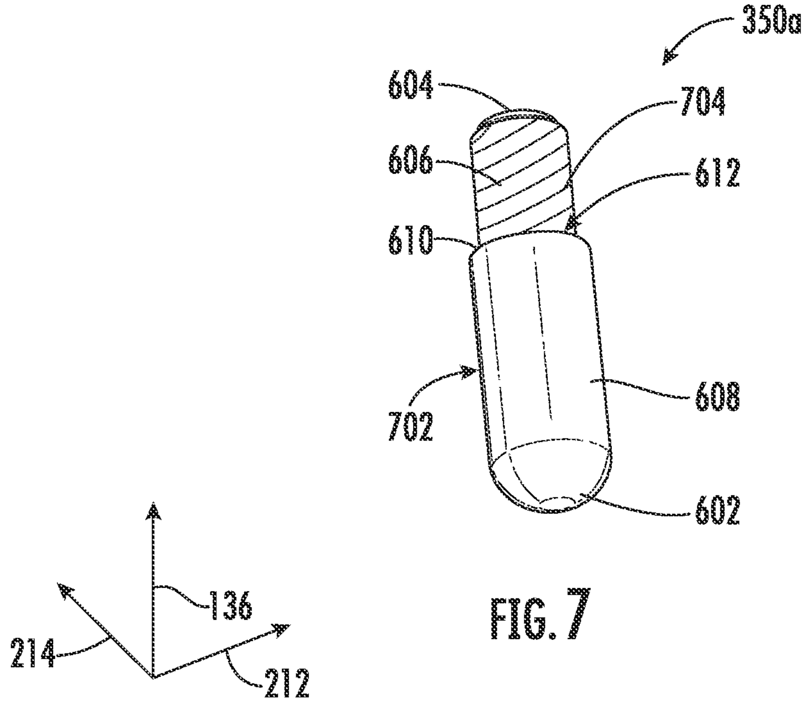
FIG. 7 illustrates another perspective view of an offset pin, according to one or more embodiments described herein.

FIG. 7 illustrates another perspective view of the offset pin 350*a*, according to one or more embodiments described herein. The offset pin 350*a* (as illustrated in FIG. 7) has an outer surface 702 that defines a helical screw ramp 704 in the print head facing portion 606 of the offset pin 350*a*. In some examples, the helical screw ramp 704 enables the coupling of the offset pin 350*a* with the recess 342 (defined in the first flange region 326) based on fastening of the offset pin with the recess 342 (defined in the first flange region 326). Further, to enable such coupling, an inner surface of the recess 342 (defined in the first flange region 326) may define counter helical screw ramp (not shown).

In an example embodiment, a clockwise rotation of the offset pin 350*a* or anti—may cause a variation in the length of the portion of the offset pin 350*a* that extends out from bottom end 334 of the first flange region 326.

In some examples, the scope of the disclosure is not limited adjusting the length of the portion of the offset pin 350*a* that extends out from the first flange region 326 based on the helical screw ramp 704. In an example embodiment, various other mechanism can be utilized to adjust the length of the portion of the offset pin 350*a*. Some examples of the various mechanisms may include, but not limited to, a push and lock mechanism (similar to retractable pen mechanism).

Referring back to FIG. 3, the print head 316 (coupled to the plurality of offset pins 350*a*, 350*b*, 350*c*, and 350*d*) is configured to be received within the top chassis portion 132. More particularly, the print head 316 (coupled to the plurality of offset pins 350*a*, 350*b*, 350*c*, and 350*d*) is configured to be received within a cavity 352 defined in the top chassis portion 132. In an example embodiment, the outer surface 204 of the top chassis portion 132 defines the cavity 352 in the top chassis portion 132 that extends from the top end portion 206 to the bottom end portion 208 along the vertical axis 136 of the print apparatus 100. In an example embodiment, defining the cavity 352 in the top chassis portion 132 leads to defining of an inner surface 354 of the top chassis portion 132. The structure of the top chassis portion 132 is further described in conjunction with FIG. 8 and FIG. 9.

Figure 8:
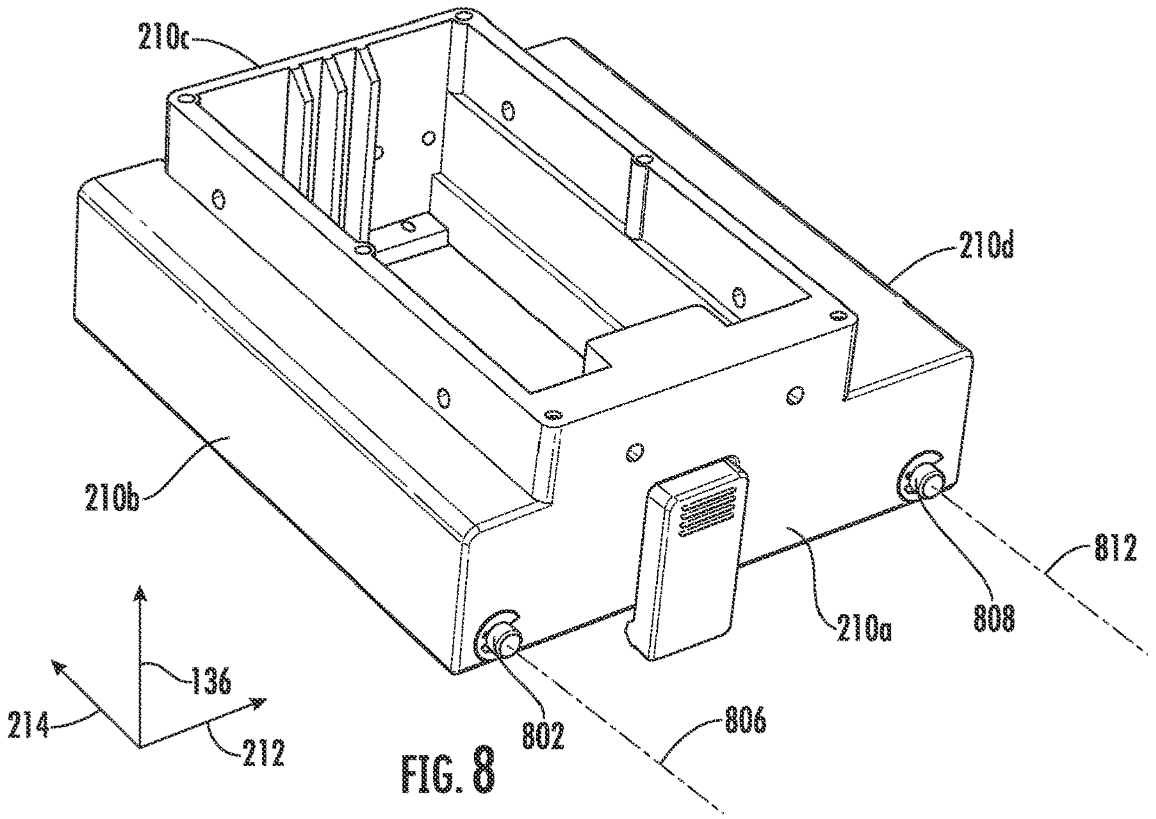
FIG. 8 illustrates a top perspective view a top chassis portion, according to one or more embodiments described herein.
Figure 9:
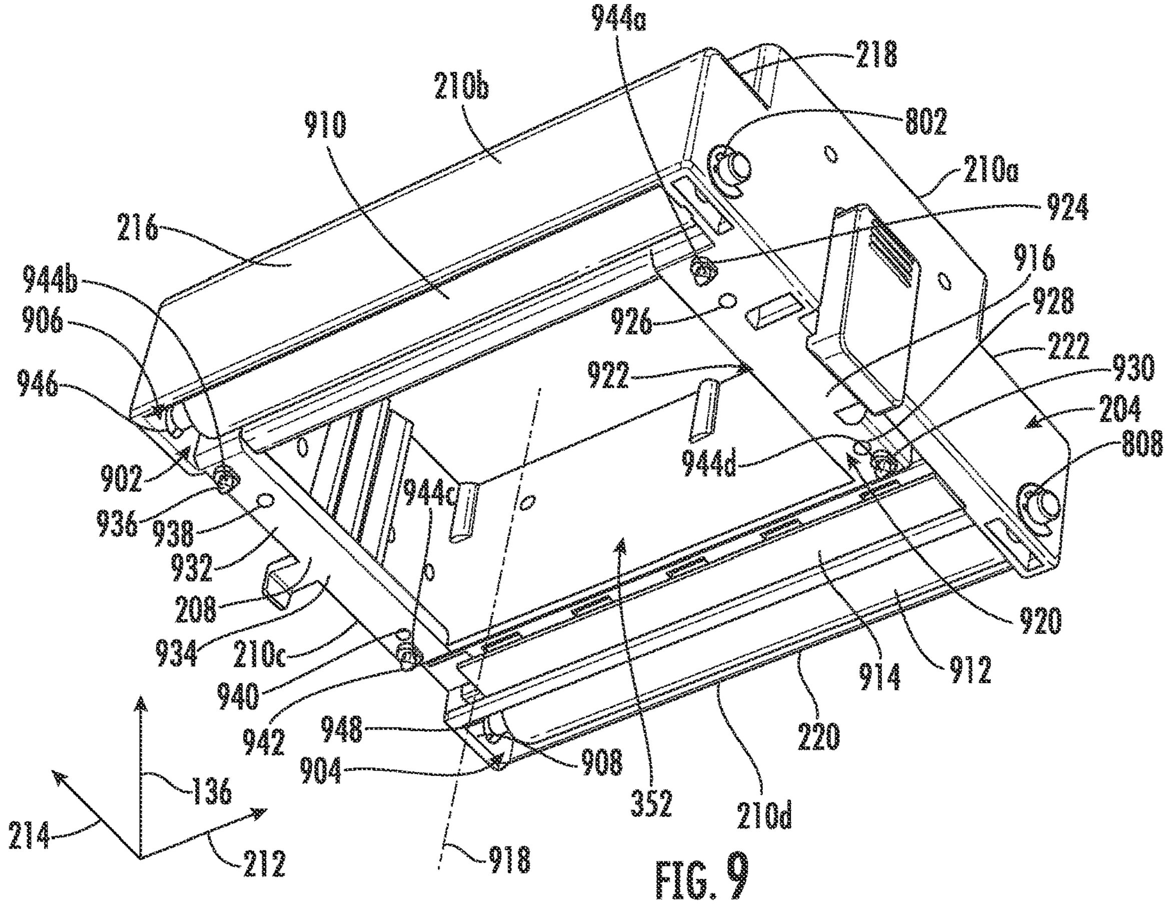
FIG. 9 illustrates a bottom perspective view of the top chassis portion, according to one or more embodiments described herein.

Referring to FIG. 8 and FIG. 9, a top perspective view and a bottom perspective view of the top chassis portion 132, respectively, are illustrated. The outer surface 204 of the top chassis portion 132 defines a first recess 902 within the first wing portion 216, and a second recess 904 within the second wing portion 220. In an example embodiment, the first recess 902 extends from the bottom end portion 208 of the top chassis portion 132 towards step 218. Further, the first recess 902 defines an inner surface 906 of the first wing portion 216. Similarly, in an example embodiment, the second recess 904 extends from the bottom end portion 208 of the top chassis portion 132 towards step 222. Further, the second recess 904 defines an inner surface 908 of the second wing portion 220.

Referring to FIG. 8, in an example embodiment, the outer surface 204 of the top chassis portion 132 defines a first through hole 802 and a second through hole 946 in the first wing portion 216. Further, the first through hole 802 and the second through hole 946 are defined on the opposite sides of the top chassis portion 132 (e.g., on the side 210*a* and the side 210*c*). In some examples, the first through hole 802 and the second through hole 946 extend from the outer surface 204 of the top chassis portion 132 to the inner surface 906 of the first wing portion 216. Furthermore, the first through hole 802 and the second through hole 946 has a common central axis 806 that aligns with the longitudinal axis 214 of the print engine assembly 130.

Similarly, in an example embodiment, the outer surface 204 of the top chassis portion 132 defines a third through hole 808 and a fourth through hole 948 in the second wing portion 220. Further, the third through hole 808 and the fourth through hole 948 are defined on the opposite sides of the top chassis portion 132 (e.g., on the side 210*a* and the side 210*c*). Furthermore, the third through hole 808 and the fourth through hole 948 extend from the outer surface 204 of the top chassis portion 132 to the inner surface 908 of the second wing portion 220. In some examples the third through hole 808 and the fourth through hole 948 has a common central axis 812 that aligns with the longitudinal axis 214 of the print engine assembly 130.

Referring back to FIG. 9, in an example embodiment, the first recess 902 is configured to receive a first roller 910 such that the first roller 910 is rotatably coupled with the first through hole 802 and the second through hole 946. Further, the second recess 904 is configured to a second roller 912 such that the second roller 912 is rotatably coupled with the third through hole 808 and the fourth through hole 948. In some examples, the first roller 910 and the second roller 912 facilitate the travel of the print media 104 along the print path.

Additionally, in some examples, the second recess 904 is configured to receive a media sensor 914. In an example embodiment, the media sensor 914 may be configured to detect a position of the print media 104 with respect to the print head 316. In some examples, the scope of the disclosure is not limited to the receiving the media sensor 914 in the second recess 904. In an example embodiment, the media sensor 914 may be received in the first recess 902, without departing from the scope of the disclosure.

Referring to FIG. 9, in an example embodiment, the inner surface 354 (defining the periphery of the cavity 352) may define a first base plate 916 at the bottom end portion 208 of the top chassis portion 132. In some examples, the first base plate 916 extends inwardly towards a central axis 918 of the cavity 352 (that extends from the bottom end portion 208 of the top chassis portion 132 to the top end portion 206 of the top chassis portion 132). Further, the first base plate 916 is defined on the side 210*a* of the top chassis portion 132. Furthermore, the first base plate 916 has an outer surface 920 and an inner surface 922. The outer surface 920 of the first base plate 916 coincides with the outer surface 204 of the top chassis portion 132 at the bottom end portion 208 of the top chassis portion 132. The inner surface 922 of the first base plate 916 faces the cavity 352. In some examples, a width of the first base plate 916 along the longitudinal axis 214 of the print engine assembly 130 is substantially same a width of the first flange region 326 (defined on print head 316) along the longitudinal axis 214 of the print engine assembly 130.

In some examples, the outer surface 920 of the first base plate 916 defines a first locator pin through hole 924, a first offset through hole 926, a second offset through hole 928, and an second locator pin through hole 930. The first locator pin through hole 924 is defined to be proximal to the side 210*a* and side 210*b*, while the second locator pin through hole 930 is defined to be proximal to the side 210*a* and the side 210*d*. Further, the first offset through hole 926 and the second offset through hole 928 are defined in such a manner that the first offset through hole 926 and the second offset through hole 928 align with the recess 342 and the recess 348 defined in the first flange region 326 and second flange region 328 (defined on the print head 316), respectively, when the print head 316 is received in the cavity 352. In some examples, the first offset through hole 926 and the second offset through hole 928 are defined to be positioned between the first locator pin through hole 924 and the second locator pin through hole 930 (along the lateral axis 212 of the print engine assembly 130).

Similar to the first base plate 916, in an example embodiment, the inner surface 354 may define a second base plate 932 at the bottom end portion 208 of the top chassis portion 132. In some examples, the second base plate 932 extends inwardly towards the central axis 918 of the cavity 352. Further, the first base plate 916 is defined on the side 210*c* of the top chassis portion 132. In some examples, the second base plate 932 is spaced apart from the first base plate 916 along the longitudinal axis 214 of the print engine assembly 130. A distance between the first base plate 916 and the second base plate 932 may be equal to the length of the print head 316 (excluding the width of first flange region 326 and the third flange region 340) along the longitudinal axis 214 of the print engine assembly 130.

In an example embodiment, the structure of the second base plate 932 may be similar to the structure of the first base plate 916. For example, an outer surface 934 of the second base plate 932 defines a third locator pin through hole 936, a third offset through hole 938, an fourth offset through hole 940, and a fourth locator pin through hole 942. The third locator pin through hole 936 is defined to be proximal to the side 210*c* and side 210*b*, while the fourth locator pin through hole 942 is defined to be proximal to the side 210*c* and 210*d*. Further, the third offset through hole 938 and the fourth offset through hole 940 are defined in such a manner that the third offset through hole 938 and the fourth offset through hole 940 align with the recess 504 and the recess 506 defined in the third flange region 340 and the fourth flange region 502 (defined on the print head 316), respectively. when the print head 316 is received in the cavity 352. In some examples, the third offset through hole 938 and the fourth offset through hole 940 are defined to be positioned between the third locator pin through hole 936 and the fourth locator pin through hole 942 (along the lateral axis 212 of the print engine assembly 130).

In an example embodiment, the first locator pin through hole 924 (defined on the first base plate 916), the second locator pin through hole 930 (defined on the first base plate 916), the third locator pin through hole 936 (defined on the second base plate 932), and the fourth locator pin through hole 942 (defined on the second base plate 932) are configured to receive one or more locator pins 944*a*, 944*b*, 944*c*, and 944*d*, respectively. In an example embodiment, the one or more locator pins 944*a*, 944*b*, 944*c*, and 944*d* may orthogonally extend out from the bottom end portion 208 of the top chassis portion 132. In some examples, the one or more location pins 944*a*, 944*b*, 944*c*, and 944*d* may be fixedly coupled with the first locator pin through hole 924 (defined on the first base plate 916), the second locator pin through hole 930 (defined on the first base plate 916), the third locator pin through hole 936 (defined on the second base plate 932), and the fourth locator pin through hole 942 (defined on the second base plate 932), respectively. In alternative embodiment, the one or more locator pins 944*a*, 944*b*, 944*c*, and 944*d* may be removably coupled with the first locator pin through hole 924 (defined on the first base plate 916), the second locator pin through hole 930 (defined on the first base plate 916), the third locator pin through hole 936 (defined on the second base plate 932), and the fourth locator pin through hole 942 (defined on the second base plate 932), respectively. In yet another embodiment, the one or more location pins 944*a*, 944*b*, 944*c*, and 944*d* may be pre-molded with the top chassis portion 132 at the bottom end portion 208 of the top chassis portion 132. In such an embodiment, the one or more locator pins 944*a*, 944*b*, 944*c*, and 944*d* may not correspond to separate components that may be assembled with the top chassis portion 132. In some examples, the one or more locator pins 944*a*, 944*b*, 944*c*, and 944*d* may ensure alignment of the top chassis portion 132 with the bottom chassis portion 134, as is further described later in conjunction with FIG. 3.

Figure 10A:
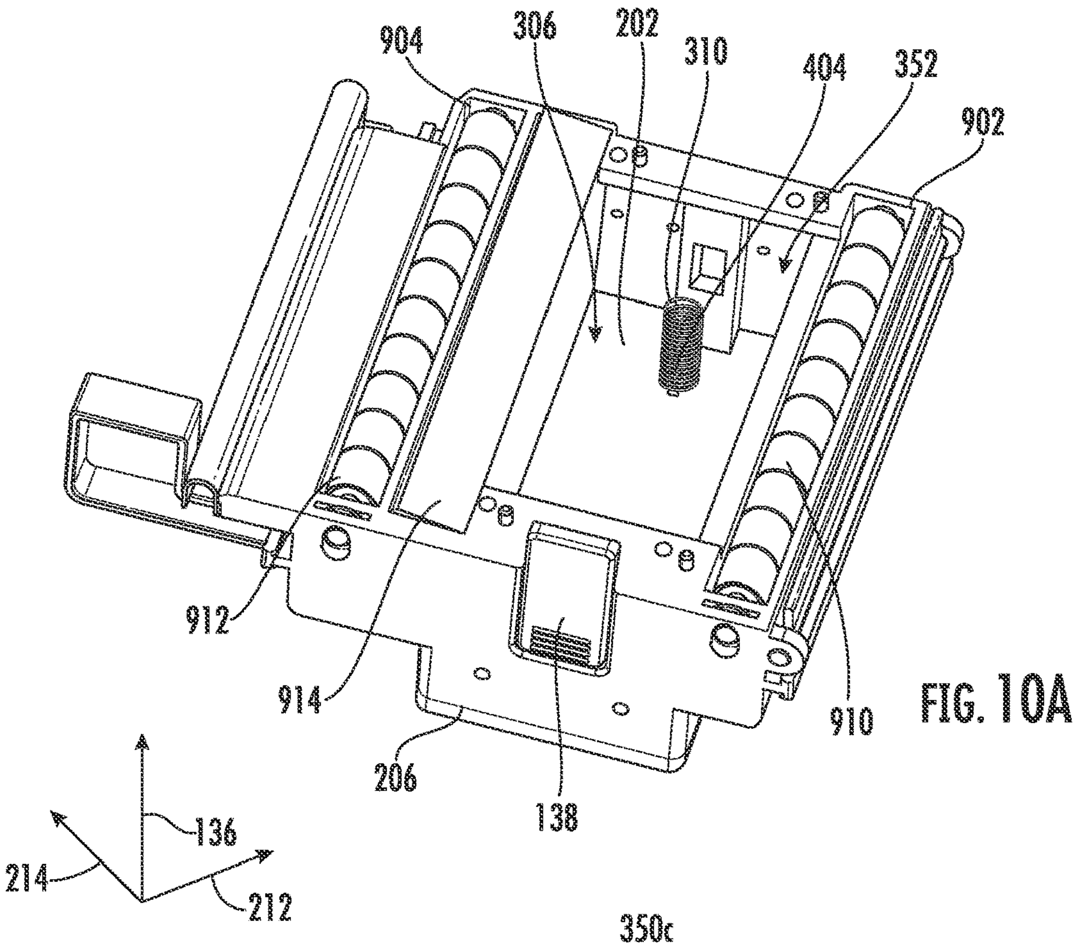
FIG. 10*a* illustrates a bottom perspective view of the top chassis portion without the print head, according to one or more embodiments described herein.
Figure 10B:
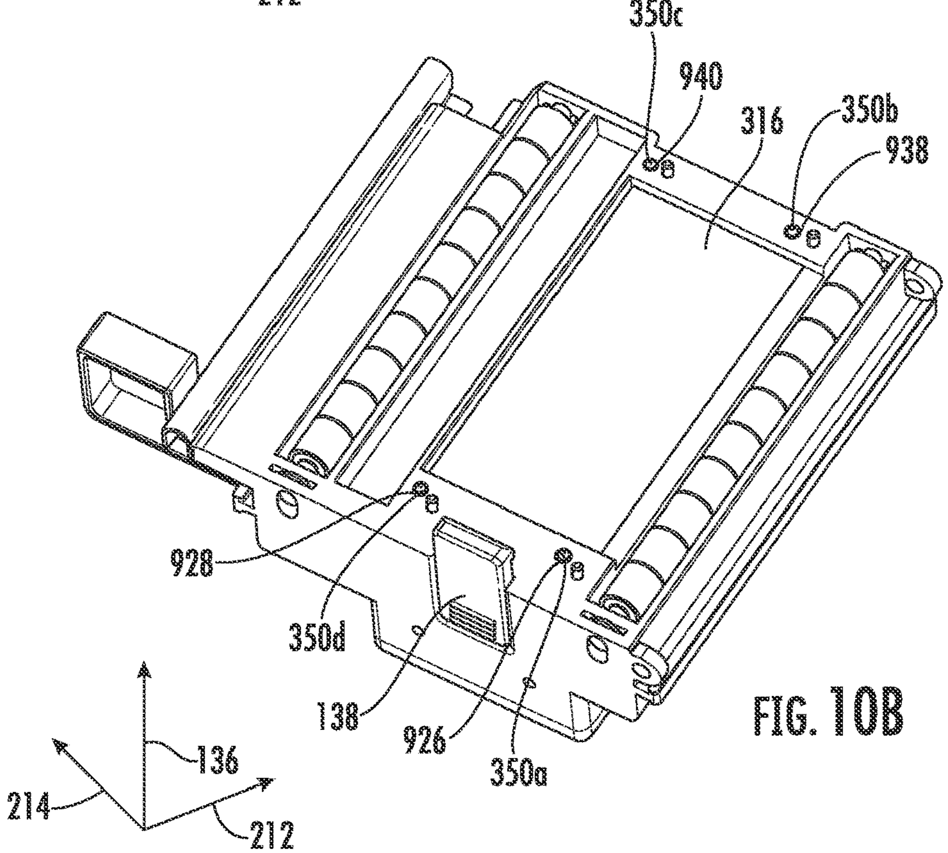
FIG. 10*b* illustrates a bottom perspective view of the top chassis portion with the print head, according to one or more embodiments described herein.

As discussed, the top chassis portion 132 is configured to receive the print head 316 in the cavity 352. FIG. 10*a* and FIG. 10*b* illustrate a bottom perspective view of the top chassis portion 132 without the print head 316, and the top chassis portion 132 with the print head 316, respectively, according to one or more embodiments described herein.

Referring to FIG. 10*a*, the top chassis cap 202 is disposed on the top end portion 206 of the top chassis portion 132. Further, the protrusions 402 and 404 extend from the bottom end portion 306 of the top chassis cap 202 into the cavity 352. In some examples, the first biasing member 308 and the second biasing member 310 are coupled to the protrusions 402 and 404, respectively such that the first biasing member 308 and the second biasing member 310 extend into the cavity 352.

In an example embodiment, the first recess 902 (defined in the first wing portion 216) receives the first roller 910. The second recess 904 (defined in the second wing portion 220) receives the second roller 912. Additionally, the second recess 904 receives the media sensor 914.

Referring to FIG. 10*b*, the print head 316 is received within the cavity 352. As discussed, the recesses 342, 348, 504 and 506 (defined in the first flange region 326, the second flange region 328, the third flange region 340, the fourth flange region 502, respectively) align with the first offset through hole 926, the second offset through hole 928, the third offset through hole 938 and the fourth offset through hole 940, respectively, when the print head 316 is received in the top chassis portion 132. Further, as discussed, the recesses 342, 348, 504 and 506 are configured to receive the plurality of offset pins 350*a*, 350*b*, 350*c*, and 350*d*, therefore, the plurality of offset pins 350*a*, 350*d*, 350*b*, and 350*c* extends out from the first offset through hole 926, the second offset through hole 928, the third offset through hole 938 and the fourth offset through hole 940 at the bottom end portion 208 of the top chassis portion 132. Further, referring to FIG. 10*b*, the one or more locator pins 944*a*, 944*b*, 944*c*, and 944*d* also extend out from the bottom end portion 208 of the top chassis portion 132.

Figure 11:
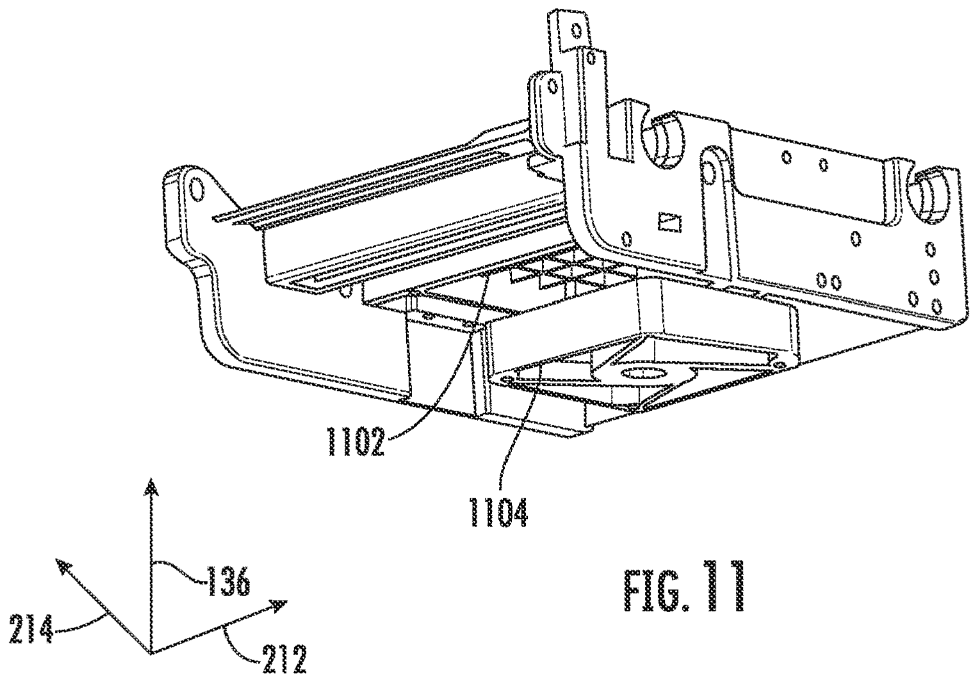
FIG. 11 illustrates a bottom perspective view of a bottom chassis portion, according to one or more embodiments described herein.

In some examples, after the top chassis portion 132 receives the print head 316, the first roller 910 and the second roller 912, the assembled top chassis portion 132 is coupled with the bottom chassis portion 134 through the latch 138. Referring back to FIG. 3, the bottom chassis portion 134 has the outer surface 224 that defines the bottom end portion 228 of the bottom chassis portion 134 and the top end portion 226 of the bottom chassis portion 134. Hereinafter, the outer surface 224 of the bottom chassis portion 134 at the top end portion 226 of the bottom chassis portion 134 is referred to as top surface 356 of the bottom chassis portion 134. The structure of the bottom chassis portion 134 is described herein in conjunction with FIG. 11. FIG. 11 illustrates a bottom perspective view of the bottom chassis portion 134, according to one or more embodiments described herein.

Referring to FIG. 3 and FIG. 11, hereinafter, the outer surface 224 of the bottom chassis portion 134 at the bottom end portion 228, of the bottom chassis portion 134, is referred to as a bottom surface 1102 of the bottom chassis portion 134. In some examples, the top surface 356 defines a platform 358 that may correspond to a region on which the print media 104 is received for printing operation. In some examples, the platform 358 is defined between the central axis 244 (passing through the first circular notch 236 and the third circular notch 240) and the central axis 246 (passing through the second circular notch 238 and the fourth circular notch 242). Further, the platform extends between the length and width of the bottom chassis portion 134.

In an example embodiment, the top surface 356 of the bottom chassis portion 134 further divides the platform 358 into a printing region 360 and a periphery region 362. An area of the printing region 360 may be defined to be proportional to a maximum size of the print media 104 supported by the printing apparatus 100. In some examples, the periphery region 362 surrounds the printing region 360.

In an example embodiment, the top surface 356 of the bottom chassis portion 134 defines a plurality of orifices 364*a*, 364*b*, . . . , 364*n* that extends from the top surface 356 of the bottom chassis portion 134 to the bottom surface 1102 of the bottom chassis portion 134. At the bottom surface 1102, the bottom chassis portion 134 is configured to receive a fan 1104. In an example embodiment, the fan 1104 may be configured to generate a negative pressure at the top surface 356 of the bottom chassis portion 134 through the plurality of orifices 364*a*, 364*b*, . . . , 364*n*. In some examples, the negative pressure enables the print media 104 to be flat during the printing operation. In some examples, the bottom chassis portion 134 may be devoid of the plurality of orifices 364*a*, 364*b*, . . . , 364*n*, and the fan 1104, with departing from the scope of the disclosure.

In an example embodiment, the top surface 356 of the bottom chassis portion 134 further defines one or more locator features 366*a*, 366*b*, 366*c*, and 366*d* proximal to each corner of the platform 358. In some examples, the one or more locator feature 366*a*, 366*b*, 366*c*, and 366*d* may correspond to a recess defines on the platform 358 that is configured to receive the one or more locator pins 944*a*, 944*b*, 944*c*, and 944*d* on the top chassis portion 132. In an example embodiment, the one or more locator features 366*a*, 366*b*, 366*c*, and 366*d* and the one or more locator pins 944*a*, 944*b*, 944*c*, and 944*d* facilitate alignment between the top chassis portion 132 and the bottom chassis portion 134 during coupling of the top chassis portion 132 with the bottom chassis portion 134.

Figure 12:
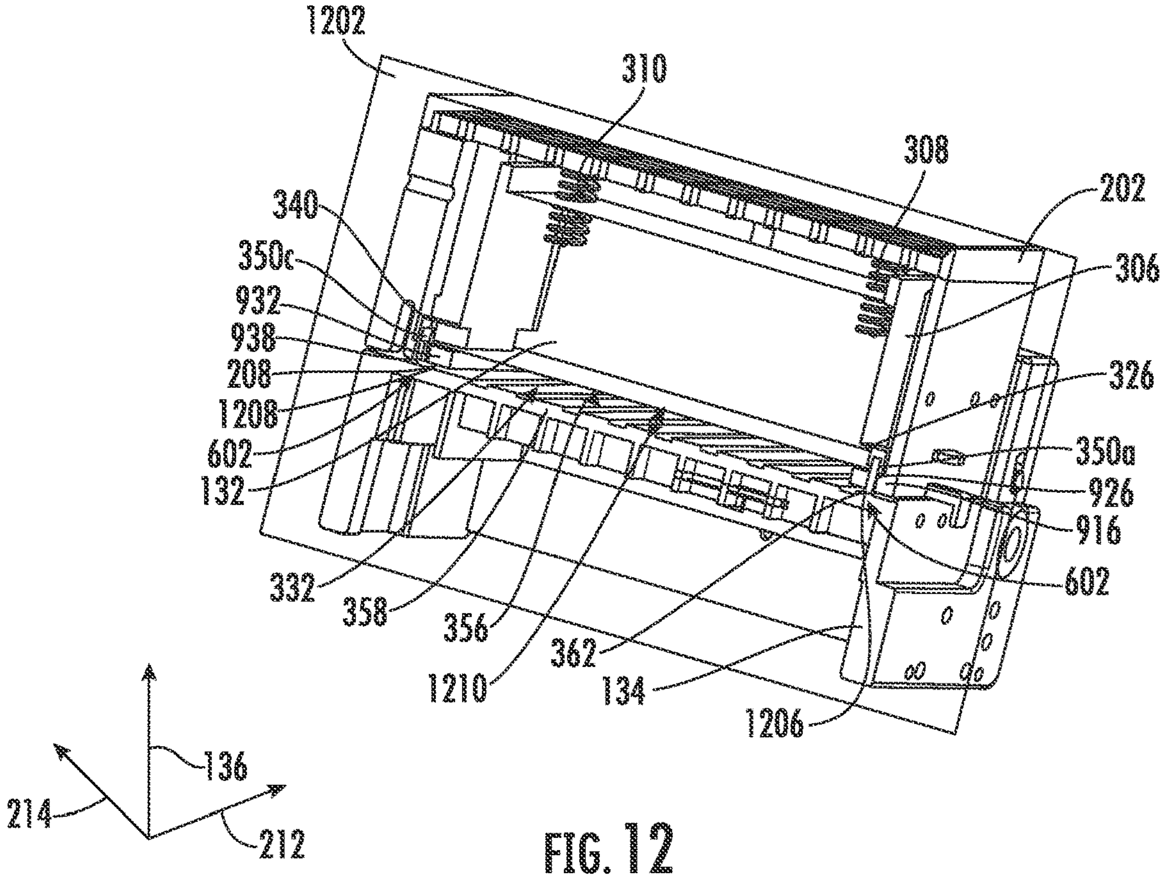
FIG. 12 illustrates a section view of the print engine assembly, according to one or more embodiments described herein.

FIG. 12 illustrates a section view of the print engine assembly 130, when a sectional plane 1202 passes through the print engine assembly 130, according to one or more embodiments described herein.

Referring to FIG. 12, the print head 316 is coupled to the top chassis cap 202 through the first biasing member 308 and the second biasing member 310. As discussed, the first biasing member 308 and the second biasing member 310 exert a downward force on the print head 316 to cause a portion 1206 of the offset pin 350*a* and a portion 1208 of the offset pin 350*c* (coupled to the first flange region 326 and the third flange region 340) to extend out from the bottom end portion 208 of the top chassis portion 132. More particularly, the portion 1206 of the offset pin 350*a* and the portion 1208 the offset pin 350*c* may extend out from the first offset through hole 926 and the third offset through hole 938 (defined on the first base plate 916 and the second base plate 932, respectively), respectively.

In some examples, the offset pin 350*a* and the offset pin 350*c* abut the top surface 356 of the bottom chassis portion 134. More particularly, the first end 602 of the offset pin 350*a* and the offset pin 350*c* abuts the periphery region 362 of the platform 358 (defined on the bottom chassis portion 134). In some examples, as the first biasing member 308 and the second biasing member 310 exert a downward force on the print head 316, the first end 602 of the offset pin 350*a* and offset pin 350*c* remains abutted to the periphery region 362 of the platform 358 (defined the bottom chassis portion 134). Accordingly, the abutting of the plurality of offset pins 350*a*, 350*b*, 350*c*, and 350*d* with the top surface 356 of the bottom chassis portion 134 causes the bottom surface 332 of the print head 316 to be positioned at a predetermined distance (depicted by 1210) from the top surface 356 of the bottom chassis portion 134. In some examples, the predetermined distance (depicted 1210) may be determined based on a focal length of the laser light source unit 512 (installed in the print head 316). In an example embodiment, the predetermined distance is determined in such that the laser light source unit 512 (installed in the print head 316) focusses the light from the laser light source 514 on the top surface 356 of the bottom chassis portion 134 during the printing operation.

Additionally, in some examples, the abutting of the plurality of offset pins 350*a*, 350*b*, 350*c*, and 350*d* ensures that the bottom surface 332 of the print head 316 is parallel to the top surface 356 of the bottom chassis portion 134. Accordingly, the print operation performed by such an arrangement of the print head 316 is free from scaling errors and orientation errors.

In an example embodiment, as discussed, the length of the portion of the plurality of offset pins 350*a*, 350*b*, 350*c*, and 350*d* are adjustable by either rotating the plurality of offset pins 350*a*, 350*b*, 350*c*, and 350*d* clockwise or anti-clockwise. Accordingly, the predetermined distance between the bottom surface 332 of the print head 316 and the top surface 356 of the bottom chassis portion 134 is adjustable. Such flexibility allows calibration of the print head 316 prior to printing operation. For example, due to mechanical vibrations in the printing apparatus 100, the predetermined distance (depicted 1210) between the print head 316 and the top surface 356 of the bottom chassis portion 134 gets modified. The adjustability of the length of the portion of the plurality of offset pins 350*a*, 350*b*, 350*c*, and 350*d* extending out from the bottom end portion 208 of the top chassis portion 132 allows the print head 316 to repositioned with respect to the bottom chassis portion 134 (for example at the predetermined distance from the bottom chassis portion 134).

Figure 13:
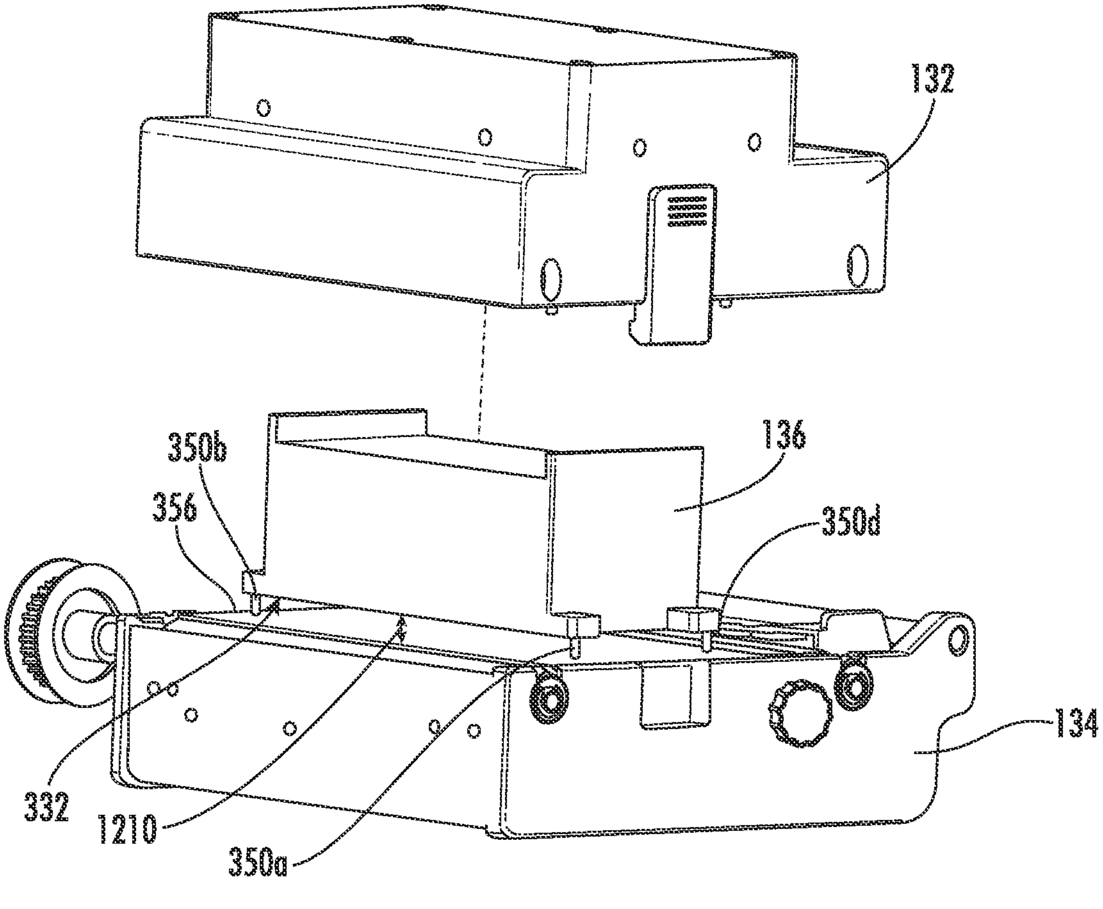
FIG. 13 illustrates a perspective view of the print engine assembly with the top chassis portion removed, according to one or more embodiments described herein.

The positioning of the print head 316 on the top surface 356 of the bottom chassis portion 134 is further illustrated in FIG. 13. FIG. 13 illustrates a perspective view of the print engine assembly 130 with the top chassis portion 132 removed, according to one or more embodiments described herein.

As shown, the print head 316 rests on the top surface 356 of the bottom chassis portion 134 through the plurality of offset pins 350*a*, 350*b*, 350*c*, and 350*d*. The plurality of offset pins 350*a*, 350*b*, 350*c*, and 350*d* ensures that the predetermined distance (depicted by 1210) is maintained between the bottom surface 332 of the print head 316 and the top surface 356 of the bottom chassis portion 134. Further, it can be observed that the bottom surface 332 of the print head 316 is parallel to the top surface 356 of the bottom chassis portion 134.

In some examples, the scope of the disclosure is not limited to the plurality of offset pins 350*a*, 350*b*, 350*c*, and 350*d* being attached to the print head 316. In an alternate embodiment, the plurality of offset pins 350*a*, 350*b*, 350*c*, and 350*d* maybe attached to the bottom chassis portion 134 and may be configured to abut the bottom surface 332 of the print head 316 to maintain the predetermined distance between the bottom chassis portion 134 and the print head 316. In such an implementation, the top surface 356 of the bottom chassis portion 134 may define one or more recesses that may be configured to receive the plurality of offset pins 350*a*, 350*b*, 350*c*, and 350*d*. The plurality of offset pins 350*a*, 350*b*, 350*c*, and 350*d* may orthogonally extend out from the top surface 356 of the bottom chassis portion 134.

When the top chassis portion 132 is coupled with the bottom chassis portion 134, the plurality of offset pins 350*a*, 350*b*, 350*c*, and 350*d* are received though the first offset through hole 926, the second offset through hole 928, the third offset through hole 938 and the fourth offset through hole 940. Further, the plurality of offset pins 350*a*, 350*b*, 350*c*, and 350*d* may abut the bottom surface 332 of the print head causing the bottom surface 332 of the print head to be positioned at the predetermined distance from the top surface 356 of the bottom chassis portion 134.

In yet another implementation, the plurality of offset pins 350*a*, 350*b*, 350*c*, and 350*d* may be movably coupled to first base plate 916 and the second base plate 932 at the first offset through hole 926, the second offset through hole 928, the third offset through hole 938 and the fourth offset through hole 940. In some examples, the plurality of offset pins 350*a*, 350*b*, 350*c*, and 350*d* may be configured to move along the vertical axis 136 of the print engine assembly 130. When the top chassis portion 132 is coupled with the bottom chassis portion 134, the first end 602 of the plurality of offset pins 350*a*, 350*b*, 350*c*, and 350*d* may abut the top surface 356 of the bottom chassis portion 134. Further, the second end 604 of the plurality of offset pins 350*a*, 350*b*, 350*c*, and 350*d* may abut the bottom surface 332 of the print head 316. Accordingly, the plurality of offset pins 350*a*, 350*b*, 350*c*, and 350*d* ensure maintenance of the predetermined distance between the print head 316 and the bottom chassis portion 134.

In the specification and figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing detailed description has set forth various embodiments of the devices and/or processes via the use of block diagrams, flow charts, schematics, exemplary, and examples. Insofar as such block diagrams, flow charts, schematics, and examples contain one or more functions and/or operations, each function and/or operation within such block diagrams, flowcharts, schematics, or examples can be implemented, individually and/or collectively, by a wide range of hardware thereof.

In one embodiment, examples of the present disclosure may be implemented via Application Specific Integrated Circuits (ASICs). However, the embodiments disclosed herein, in whole or in part, can be equivalently implemented in standard integrated circuits, as one or more computer programs running on one or more computers (e.g., as one or more programs running on one or more computer systems), as one or more programs running on one or more processing circuitries (e.g., micro-processing circuitries), as one or more programs running on one or more processors (e.g., microprocessors), as firmware, or as virtually any combination thereof.

In addition, those skilled in the art will appreciate that example mechanisms disclosed herein may be capable of being distributed as a program product in a variety of tangible forms, and that an illustrative embodiment applies equally regardless of the particular type of tangible instruction bearing media used to actually carry out the distribution. Examples of tangible instruction bearing media include, but are not limited to, the following: recordable type media such as floppy disks, hard disk drives, CD ROMs, digital tape, flash drives, and computer memory.

The various embodiments described above can be combined with one another to provide further embodiments. For example, two or more of example embodiments described above may be combined to, for example, improve the safety of laser printing and reduce the risks associated with laser-related accidents and injuries. These and other changes may be made to the present systems and methods in light of the above detailed description. Accordingly, the disclosure is not limited by the disclosure, but instead its scope is to be determined by the following claims.

The invention claimed is:

1. A printing apparatus comprising:

a print engine assembly, the print engine assembly comprising:

a bottom chassis portion;

a top chassis portion;

a print head positioned within the top chassis portion; and a plurality of offset pins extending out from the bottom chassis portion, wherein the plurality of offset pins abut the print head such that a top surface of the bottom chassis portion is positioned at a predetermined distance from the print head, wherein the top surface of the bottom chassis portion is configured to receive print media.

2. The printing apparatus according to claim 1, wherein the top chassis portion has an outer surface that defines:

a top end portion, wherein the top end portion is distal from the bottom chassis portion, a bottom end portion spaced apart from the top end portion, wherein the bottom end portion is proximal to the bottom chassis portion, and a cavity extending from the top end portion to the bottom end portion.

3. The printing apparatus according to claim 2, wherein the print engine assembly further comprises a top chassis cap coupled to the top chassis portion at the top end portion of the top chassis portion, wherein the top chassis cap is positioned to cover the cavity.

4. The printing apparatus according to claim 3 further comprising at least one biasing member, wherein a first end of the at least one biasing member is coupled to the top chassis cap and a second end of the at least one biasing member is coupled to the print head.

5. The printing apparatus according to claim 2, wherein the print head is positioned in the cavity.

6. The printing apparatus according to claim 1, wherein each of the plurality of offset pins comprise a first end and a second end, wherein the second end of the plurality of offset pins is fixedly coupled to the top surface of the bottom chassis portion, and wherein the first end of the plurality of offset pins abuts a bottom surface of the print head.

7. The printing apparatus according to claim 1, wherein a top surface of the bottom chassis portion defines a plurality of recesses such that an inner surface of the plurality of recesses defines a screw ramp.

8. The printing apparatus according to claim 7, wherein each of the plurality of offset pins comprise an outer surface that defines a counter screw ramp corresponding to the screw ramp defined by the inner surface of the print head in the plurality of recesses, wherein the counter screw ramp on the plurality of offset pins enables coupling of the plurality of offset pins with the plurality of recesses.

9. The printing apparatus according to claim 8, wherein a length of the plurality of offset pins is adjustable based on rotation of the plurality of offset pins within the plurality of recesses, wherein the predetermined distance is adjustable based on the length of the plurality of offset pins extending out from the top surface of the bottom chassis portion.

10. A print engine assembly comprising:

a print head chassis comprising:

a bottom chassis portion;

a top chassis portion;

a print head positioned within the top chassis portion; and a plurality of offset pins extending outwardly from the bottom chassis portion, wherein at least one of the plurality of offset pins abuts the print head such that a top surface of the bottom chassis portion is positioned to be at a predetermined distance from the print head, wherein the top surface of the bottom chassis portion is configured to receive print media.

11. The print engine assembly according to claim 10, wherein the top chassis portion has an outer surface that defines:

a top end portion, wherein the top end portion is distal from the bottom chassis portion, a bottom end portion spaced apart from the top end portion, wherein the bottom end portion is proximal to the bottom chassis portion, and a cavity extending from the top end portion to the bottom end portion.

12. The print engine assembly according to claim 11 further comprising a top chassis cap coupled to the top chassis portion at the top end portion of the top chassis portion, wherein the top chassis cap is positioned to cover the cavity from the top end portion of the top chassis portion.

13. The print engine assembly according to claim 12 further comprising at least one biasing member, wherein a first end of the at least one biasing member is coupled to the top chassis cap and a second end of the at least one biasing member is coupled to the print head.

14. The print engine assembly according to claim 11, wherein the print head is positioned in the cavity.

15. The print engine assembly according to claim 10, wherein at least one of the plurality of offset pins comprises a first end and a second end, wherein the second end of the at least one of the plurality of offset pins is fixedly coupled to the top surface of the bottom chassis portion, and wherein the first end of the at least one of the plurality of offset pins abuts the print head.

16. The print engine assembly according to claim 10, wherein a top surface of the print head defines a plurality of recesses such that an inner surface of the plurality of recesses defines a screw ramp.

17. The print engine assembly according to claim 16, wherein the at least one of the plurality of offset pins comprises an outer surface that defines a counter screw ramp, corresponding to the screw ramp defined by the inner surface of the print head in the at least one of the plurality of recesses, wherein the counter screw ramp on the at least one of the plurality of offset pins enables coupling of the at least one of the plurality of offset pins with the plurality of recesses.

18. The print engine assembly according to claim 17, wherein a length of the at least one of the plurality of offset pins extending out from the top surface of the bottom chassis portion is adjustable based on rotation of the at least one of the plurality of offset pins within the plurality of recesses, wherein the predetermined distance of the print head from the top surface of the bottom chassis portion is adjustable based on the length of the at least one of the plurality of offset pins extending out from the top surface of the bottom chassis portion.

19. A printing apparatus comprising:

a print engine assembly, the print engine assembly comprising:

a bottom chassis portion, wherein the bottom chassis portion is configured to receive print media;

a top chassis portion;

a print head positioned within the top chassis portion; and an offset pin that extends outwardly from the print head and positions the bottom chassis portion at a predetermined distance in an instance in which the top chassis portion and the bottom chassis portion are latched.

20. The printing apparatus according to claim 19, wherein the offset pin comprises a first end and a second end, wherein the second end is fixedly coupled to the bottom chassis portion, and wherein the first end of the offset pin abuts the print head.

* * * * *